United States Patent
Azizi et al.

(10) Patent No.: US 12,047,814 B2
(45) Date of Patent: Jul. 23, 2024

(54) METHODS AND APPARATUS FOR COORDINATION OF NETWORK TRAFFIC BETWEEN WIRELESS NETWORK DEVICES AND COMPUTING PLATFORMS

(71) Applicant: Intel Corporation, Santa Clara, CA (US)

(72) Inventors: Shahrnaz Azizi, Cupertino, CA (US); Ashraf H Wadaa, Beaverton, OR (US); Nir Yizhak Balaban, Kfar Netter (IL); Leor Rom, Haifa (IL); Ajay Gupta, Portland, OR (US); Ravikumar Balakrishnan, Beaverton, OR (US); Venkateshan Udhayan, Hillsboro, OR (US); Ariela Zeira, Encinitas, CA (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 16/937,270

(22) Filed: Jul. 23, 2020

(65) Prior Publication Data

US 2020/0359265 A1 Nov. 12, 2020

(51) Int. Cl.
*H04W 28/08* (2023.01)
*H04W 28/02* (2009.01)
(Continued)

(52) U.S. Cl.
CPC ... *H04W 28/0908* (2020.05); *H04W 28/0221* (2013.01); *H04W 28/06* (2013.01); *H04W 52/0216* (2013.01)

(58) Field of Classification Search
CPC ......... H04W 28/0908; H04W 52/0216; H04W 28/0221; H04W 28/00; H04L 47/24;
(Continued)

(56) References Cited

U.S. PATENT DOCUMENTS

| | | | | |
|---|---|---|---|---|
| 2011/0040706 A1* | 2/2011 | Sen | ......... | G06N 20/00 706/12 |
| 2016/0105847 A1 | 4/2016 | Smith et al. | | |

(Continued)

FOREIGN PATENT DOCUMENTS

| | | | | |
|---|---|---|---|---|
| WO | 2005002137 A1 | 1/2005 | | |
| WO | WO-2016050916 A1 * | 4/2016 | ........... | H04L 1/0002 |

OTHER PUBLICATIONS

Draper-Gil et al., "Characterization of Encrypted and VPN Traffic using Time-related Features," Proceedings of the 2nd International Conference on Information Systems Security and Privacy (ICISSP). 2016, pp. pp. 407-414 (8 pages).

(Continued)

*Primary Examiner* — Chi H Pham
*Assistant Examiner* — Ji-Hae Yea
(74) *Attorney, Agent, or Firm* — Hanley, Flight & Zimmerman, LLC

(57) ABSTRACT

Methods, apparatus, systems, and articles of manufacture are disclosed that coordinate network traffic between a wireless network device and a computing platform. An example apparatus includes a wake-up selector to generate a target wait time parameter based on a workload type of a number of packets obtained from a network device and a user preference, the target wait time parameter indicative of a time interval that, when met, causes a modem to retrieve the number of packets, a data frame generator to generate a data frame that causes the network device to buffer the number of packets for the time interval, and a network packet controller to negotiate, using the data frame, the target wait time parameter with a network device.

20 Claims, 13 Drawing Sheets

(51) Int. Cl.
*H04W 28/06* (2009.01)
*H04W 52/02* (2009.01)

(58) Field of Classification Search
CPC ... H04L 47/2416; H04L 47/283; G06N 20/00; G06N 3/048; G06N 3/08; G06N 3/0895; G06N 3/09; G06N 3/091; G06N 3/092; G06N 3/094; G06N 3/096; G06N 3/098; G06N 3/0985; Y02D 30/70
See application file for complete search history.

(56) References Cited

U.S. PATENT DOCUMENTS

| | | | | |
|---|---|---|---|---|
| 2016/0359661 | A1* | 12/2016 | Chhabra | H04B 7/0413 |
| 2019/0199602 | A1 | 6/2019 | Zhang et al. | |
| 2020/0084102 | A1* | 3/2020 | Choi | H04L 41/50 |
| 2020/0341791 | A1 | 10/2020 | Tsirkin | |
| 2020/0358685 | A1 | 11/2020 | Gupta et al. | |
| 2020/0382922 | A1 | 12/2020 | Park et al. | |

OTHER PUBLICATIONS

Aruba a Hewlett Packard Enterprise Company, "White Paper 802.11AX," retrieved from https://www.arubanetworks.com/assets/wp/WP_802.11AX.pdf, 38 pages.

THOMAS-KRENN-WIKI, "Processor P-states and C-states," retrieved from https://www.thomas-krenn.com/en/wiki/Processor_P-states_and_C-states, Jan. 7, 2019, 4 pages.

Jeyaseelan et al., "Devices Guidelines for PCI Express* Technology Extensions," Intel Development Forum 2010, 31 pages.

United States Patent and Trademark Office, "Non-Final Office Action", issued in connection with U.S. Appl. No. 16/937,267 dated Oct. 4, 2023, 16 pages.

European Patent Office, "Extended European Search Report", issued in connection with EP Patent Application No. 20216299.6 dated Jun. 8, 2021, 14 pages.

* cited by examiner

METHODS AND APPARATUS FOR COORDINATION OF NETWORK TRAFFIC BETWEEN WIRELESS NETWORK DEVICES AND COMPUTING PLATFORMS

FIELD OF THE DISCLOSURE

This disclosure relates generally to computing platforms and network devices, and, more particularly, to methods and apparatus for coordination of network traffic between wireless network devices and computing platforms.

BACKGROUND

Many locations provide Wi-Fi to connect Wi-Fi enabled devices to networks such as the Internet. Wi-Fi enabled devices include personal computers, video-game consoles, mobile phones, digital cameras, tablets, smart televisions, digital audio players, etc. Wi-Fi allows the Wi-Fi enabled devices to wirelessly access the Internet via a wireless local area network (WLAN). To provide Wi-Fi connectivity to a device, a Wi-Fi access point exchanges radio frequency Wi-Fi signals with the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

The figures are not to scale. In general, the same reference numbers will be used throughout the drawing(s) and accompanying written description to refer to the same or like parts.

Figure 1:
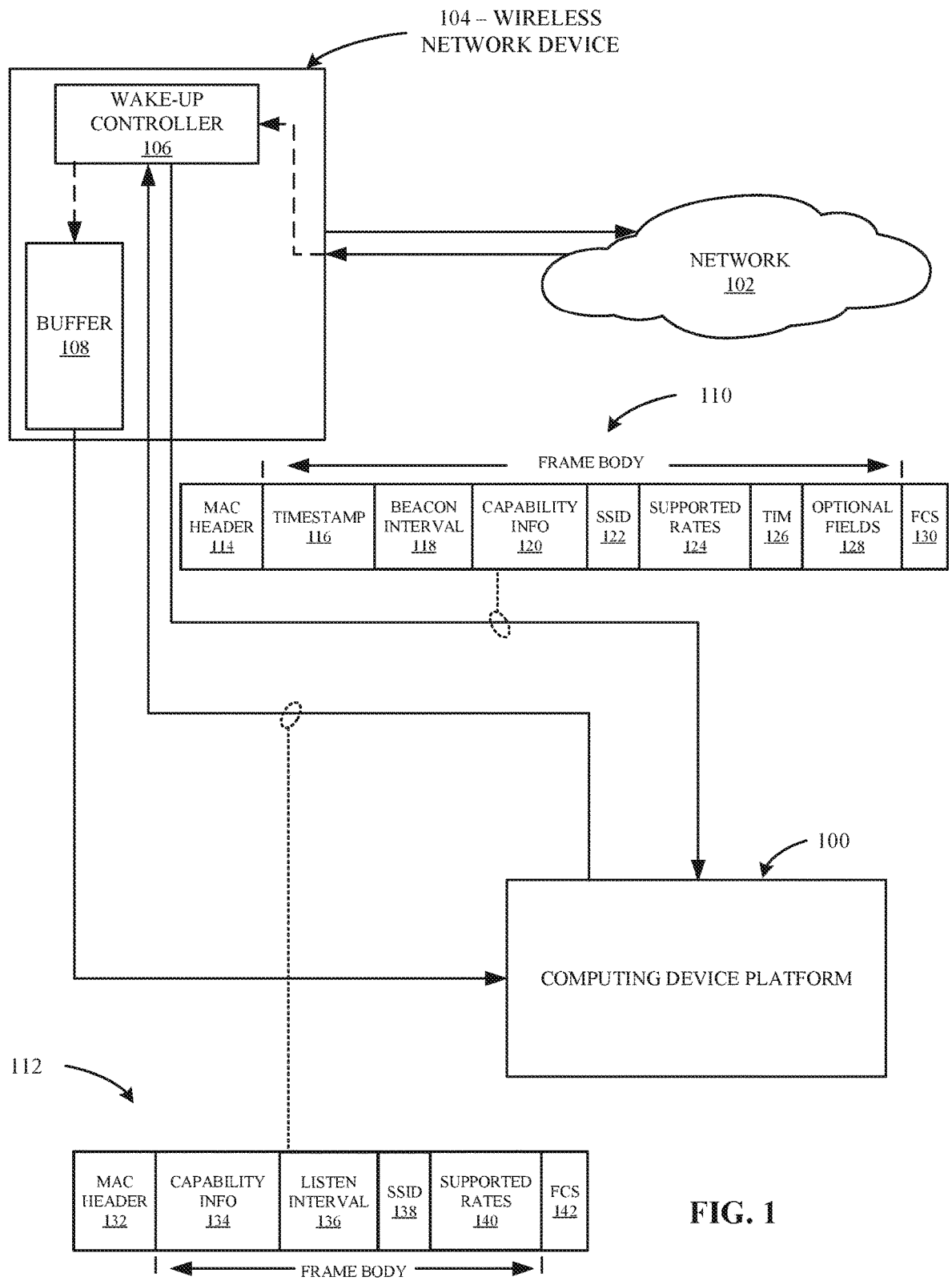
FIG. 1 is a block diagram of an example computing device platform operating in a wireless network system.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Wireless networks transmit and receive information utilizing varying techniques. For example, two common and widely adopted techniques used for wireless communication are those that adhere to the Institute for Electronic and Electrical Engineers (IEEE) 802.11 standards such as the IEEE 802.11n standard and the IEEE 802.11 ac standard.

The IEEE 802.11 standards specify a common Medium Access Control (MAC) Layer that provides a variety of functions to support the operation of IEEE 802.11-based wireless LANs (WLANs). The MAC Layer manages and maintains communications between IEEE 802.11 stations, such as between a modem (e.g., radio network interface cards (NIC) in a PC, other wireless device(s), or stations (STA)) and access points (APs), by coordinating access to a shared radio channel and utilizing protocols that enhance communications over a wireless medium.

Mobile platform power management is critical for battery-powered small form factor platforms such as smartphones, tablets, and wearable and IoT devices. Most mobile platform workloads are communication driven and the modem (e.g., wireless radio NIC) is often one of the main sources of the power consumption of the platform. With the continuous demand for prolonging the battery life of client platforms (mobile platforms, non-mobile platforms, etc.), along with defining new key performance indicators (KPIs) for latency and responsiveness over wireless links (e.g., a wireless distribution method that provides a connection between the Internet and the client platform through an access point (AP)), there is an emergent need to reduce overall platform power consumption without affecting the user experience.

A modem is a hardware device that converts data into a format suitable for a transmission medium so that the data can be transmitted from one computing system to another. In recent years, modems have been integrated on platforms of personal computing devices, such as laptops, tablets, mobile phones, etc., to facilitate data transmission and data connection between the personal computing devices and a network. For example, modems convert data from a network (e.g., from an AP) into a form that processors of the personal computing device can understand and then send the data to memory accessed by the processors. Developers of the integrated platforms have designed and fabricated hardware and software features that enable such an integrated platform to efficiently move data to and from a network and the main processing component (e.g., central processing unit, accelerator, etc.). Such features may facilitate a communication and/or coordination system between the main processing component and the modem, where the modem can coordinate particular times to send data to memory accessed by the main processing unit.

In some examples, the coordination between the main processing component and modem facilitates power saving by enabling the main processing component to operate in low power states when the modem determines that access to memory is not needed. For example, interrupt coalescing is a coordination feature that reduces the number of interrupts (e.g., the number of signals sent to the CPU from the modem) to the main processing component (e.g., CPU) in particular situations (e.g., high throughput situations). For example, when the modem is in an active state, the interrupt coalescing feature holds back interrupts to the CPU until a timeout timer triggers, incurring relatively small or large latency penalties. In such an example, the modem buffers data from the network (e.g., an AP) to reduce the number of interrupts to the main processing component. However, interrupt coalescing is not an efficient power saving method given that different types of workloads (e.g., data packets from the network) require different levels of interrupts (e.g., different latency requirements) and that different personal computing devices can execute (e.g., run) multiple different workloads (e.g., applications, programs, etc.) at once. Additionally, the efficiency of these existing techniques (e.g., interrupt coalescing) is bounded by the random-access nature of the IEEE 802.11 WLAN Protocol (Wi-Fi) as well as the limited in-device buffering capability of the modem. In some examples, the fundamental problem of balancing power and performance between the modem and the CPU is that the modem is to quickly transfer the received data (e.g., received from an AP) from the limited buffer space of the modem to the memory to avoid buffer overrun. In some examples, buffer overrun causes loss of data and, as a result, negatively impacts the user experience.

For example, different workload scenarios are considered. In an example first scenario, the modem obtains streaming workloads (e.g., Netflix®, YouTube®, etc.) and the platform mutes audio (e.g., the audio portion of the streaming workload is not output to a user of the platform). Such streaming workloads are similar to a file download, where the network traffic corresponding to the streaming workload is downloaded at the main memory (e.g., stored in the main memory) and then idle in the main memory for a period of time (e.g., until the processor retrieves the network traffic of the streaming workload). The streaming workload can be idle (e.g., not accessed and/or not used to cause the computing device to perform an action) for a period of time because audio is muted and, thus, losing audio frames incurs no performance issues. In the example first scenario, both the modem and the CPU can enter power saving states (e.g., the CPU may be constrained by other devices such as a display) during the idle period of time if an optimal coordination existed between the AP, the modem, and the platform. However, such power saving does not occur because (a) Wi-Fi implementation and configuration prevents the modem from entering certain power saving states to prevent delays of transferring the data from the AP to the modem, and (b) the modem prevents the CPU from entering certain power saving states (e.g., C-states) because the modem selects latency values conservatively.

In contrast, an example second scenario includes the modem obtaining latency sensitive workloads (e.g., Skype®, WhatsApp® video call, or background audio). In such an example, neither the modem nor the CPU can enter power saving states due to the latency requirements of the workload. The current features of Wi-Fi and client platforms do not distinguish between these two example scenarios because the AP is not aware of user preferences (e.g., user requirements for power and performance) and workload requirements (e.g., priority requirements, QoS, etc.). For example, the AP is not notified of power saving preferences of the client platform nor of the latency and performance requirements of the workload, and, therefore, continuously provides network data packets to the modem regardless of such requirements, causing the modem to exit the power saving states and enter power execution states each time the AP provides the network data packets. In some examples, when client platforms run background workloads in addition to main workloads such as streaming or video calling, the background workloads cause the modem to frequently exit power saving states to receive push notifications, receive background data, collect network discovery messages, etc.

Examples disclosed herein generate dynamic latency values and, thus, dynamic interrupts based on how long network data packets can be buffered at the modem, which is dependent on workload types running on a processor (e.g., CPU, graphics processing unit (GPU), field programmable gate array (FPGA), etc.) and the buffer length of the modem. As used herein, the latency values are values of time that indicate an amount of time the modem can buffer network data packets before the modem no longer has available memory. Therefore, the latency values indicate whether the processor is to enter a power saving state or a power execution state. For example, the latency value informs the processor and/or memory that the modem will be buffering network data packets for a period of time (e.g., a maximum amount of time) before the modem will attempt to access memory. Such latency values and interrupts can be dynamic in terms of throughput and tolerance, where the throughput corresponds to throughput of network data packets and the tolerance corresponds to how much latency can be tolerated for the workload of the data without impacting user experience. Examples disclosed herein train a model to classify network data packets into a workload category (e.g., a workload type). Examples disclosed herein include a modem that, when active, infers the type of incoming network data packets and makes a decision about the latency required to process the type of network data packets.

Examples disclosed herein coordinate network data buffering and transmitting between an AP and a modem based on workload requirements and user requirements. The workload requirements correspond to computing resources required, desired, etc., to execute the workload for optimal performance. In some examples, such computing resources include, but are not limited to, latency, throughput, bit rate, etc. The user requirements correspond to a user preference between saving battery life and optimal performance. In some examples, the preferences include a ratio favoring power saving, a ratio favoring performance enhancement, a ratio favoring power saving and performance enhancement, and/or other ratios between power consumption and performance. A ratio may favor one preference over a different preference and/or may favor both preferences equally. For example, examples disclosed herein select a wake-up time that facilitates a balance between a power saving state of the modem and a wake-up state of the modem to receive network data from the AP. Examples disclosed herein generate parameters that inform an AP of a period of time for which the AP is to buffer network data, set beacon intervals, etc., based on user requirements and workload requirements. Such examples enable the processor to enter high level power saving states when power saving is preferred and, thus, reduces power consumption of the processor when power consumption is not needed and/or desired.

Examples disclosed herein implement artificial intelligence to generate dynamic latency values that enable a processor to enter a power saving state or a low power state. Artificial intelligence (AI), including machine learning (ML), deep learning (DL), and/or other artificial machine-driven logic, enables machines (e.g., systems, computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model is used. Using a neural network model enables the classification of network data packets based on their packet features, such as length (e.g., number of packets corresponding to a same workload flow), inter-arrival time, source, destination, etc. In general, machine learning models/architectures that are suitable to use in the example approaches disclosed herein will be Recurrent Neural Networks (RNN). However, other types of machine learning models could additionally or alternatively be used such as Long/Short Term Memory (LSTM) models, a Radial basis models, Kohonen Self Organizing models, etc.

In general, implementing a ML/AI system involves at least two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved in predicting and classifying network data packets. In examples disclosed herein, training is performed at the computing device (e.g., locally). In some examples, training is performed remotely (e.g., at a central facility). Training is performed using hyperparameters that control how the learning is performed (e.g., a learning rate, a number of layers to be used in the machine learning model, etc.). In examples disclosed herein, hyperparameters that control a number of packet features and packets per network flow are used. Such hyperparameters are selected based on, for example, compute capabilities of the computing device and/or the central facility and real-time requirements. In some examples re-training may be performed. Such re-training may be performed in response to an unknown packet features, new workload categories, etc.

Training is performed using training data. In examples disclosed herein, the training data originates from locally generated data. Because supervised training is used, the training data is labeled. Labeling is applied to the training data by a pre-process controller. In some examples, the training data is pre-processed using, for example, known features that indicate a workload type of network data packets.

Once training is complete, the model is deployed for use as an executable construct that processes an input and provides an output based on the network of nodes and connections defined in the model. The model is stored at the modem of the personal computing device. The model may then be executed by the prediction controller of the modem. In other examples, a network interface card (NIC) stores the model at the personal computing device, where the host networking stack is executed. Additionally and/or alternatively, the model is stored externally if the modem does not have the resources (e.g., compute capabilities) to execute such a model.

Once trained, the deployed model may be operated in an inference phase to process data. In the inference phase, data to be analyzed (e.g., live data) is input to the model, and the model executes to create an output. This inference phase can be thought of as the A "thinking" to generate the output based on what it learned from the training (e.g., by executing the model to apply the learned patterns of the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.). For example, a workload may be classified as real-time or non-real-time, where the real-time workload is further classified as a type of real-time (e.g. audio only, audio video, gaming, etc.) workload and the non-real time workload may be further classified as a type of non-real-time workload.

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a block diagram of an example computing device platform 100 operating in a wireless network system. The example wireless network system of FIG. 1 includes the example computing device platform 100, an example network 102, and an example wireless network device 104. The example wireless network device 104 includes an example wake-up controller 106 and an example buffer 108.

In FIG. 1, the example computing device platform 100 is hardware and/or software implemented to execute workloads, such as applications, programs, process, etc., at a computing device. The example computing device platform 100 defines a set of capabilities of the computing device. The computing device platform 100 may be any hardware computing device such as a mobile phone, laptop, tablet, desktop, etc., any operating system platform, any client/server platform such as a web server, any mobile platform such as a mobile application platform, any cloud platform, and/or any other suitable platform for executing data packets. The example computing device platform 100 is described in further detail below in connection with FIG. 2.

In FIG. 1, the example network 102 is the Internet. However, the network 102 may be implemented using any suitable wired and/or wireless network(s) including, for example, one or more data buses, one or more Local Area Networks (LANs), one or more wireless LANs (WLANs), one or more cellular networks, one or more private networks, one or more public networks, etc. The example network 102, in connection with the example wireless network device 104, enables the computing device platform 100 to send and receive network information requested by a user of the computing device platform 100.

In FIG. 1, the example wireless network system includes the example wireless network device 104 to enable the example computing device platform 100 to connect to the example network 102. In FIG. 1, the example wireless network device 104 is an Access Point (AP). However, the example wireless network device 104 may be any other type of hardware and/or software device that connects the example computing device platform 100 to the example network 102. The example wireless network device 104 may service multiple computing device platforms. For example, the wireless network device 104 may connect any number of client platforms, such as mobile phones, laptops, tablets, etc., to the network 102 to receive Internet data and/or network data. In some examples, the wireless network device 104 communicates and/or routes Internet and/or network data to the computing device platform 100 when the computing device platform 100 establishes a Wi-Fi (802.11) connection with the wireless network device 104. Conventionally, the Wi-Fi connection between the wireless network device 104 and the computing device platform 100 is generic and follows the 802.11 protocol (e.g., the wireless network device 104 is unaware of workload and user requirements of the computing device platform 100 and operates as normal under the 802.11 protocol). However, in examples disclosed herein, the example computing device platform 100 establishes a Wi-Fi connection with the example wireless network device 104 and coordinates timing of network data retrieval and transmittal based on workload requirements and user requirements In FIG. 1, the example wireless network device 104 includes the example wake-up controller 106 to generate data frames that inform the example computing device platform 100 of available network data. The example wake-up controller 106 may implement power saving protocols defined in the IEEE 802.11 ax standard by providing the computing device platform 100 with high throughput and low latency wireless links while reducing power consumption. Such power saving protocols are implemented through communication and/or negotiation between the wake-up controller 106 and the computing device platform 100, where the wake-up controller 106 informs the computing device platform 100 that the example buffer 108 will buffer network data for a period of time to allow the computing device platform 100 to enter power saving states. However, the period of time for buffering may not be sufficient for the computing device platform 100 to enter appropriate power saving states due to the workload type executing at the computing device platform 100, the user requirements of the computing device platform 100, etc. Therefore, in examples disclosed herein, the example wake-up controller 106 receives information from the example computing device platform 100 corresponding to sufficient times to buffer network data, send network data, and/or wake-up the example computing device platform 100. As used herein, the term "wake-up" refers to triggering the computing device platform 100 to exit an idle state or sleep mode and enter an execution state or active mode.

In FIG. 1, the example wake-up controller 106 generates example AP data frames 110 that include information intended for the example computing device platform 100. In FIG. 1, the example computing device platform 100 generates example modem data frames 112 that include information intended for the example wake-up controller 106 and/or more generally the example wireless network device 104.

In FIG. 1, the example AP data frame 110 is a beacon frame. A beacon frame is a management frame, used by an AP (e.g., the wireless network device 104), to communicate, throughout the serviced area (e.g., the wireless network system), the characteristics of the connection offered to the computing device platform 100. Additionally and/or alternatively, the example wake-up controller 106 and/or more generally the example wireless network device 104 may send any other type of frame and protocol defined by the IEEE standard (Wi-Fi). The example AP data frame 110 is sent periodically, to the computing device platform 100, at beacon intervals (e.g., a standard beacon interval is equal to 102.4 milliseconds). The example AP data frame 110 includes a frame format that communicates the characteristics of the connection between the wireless network device 104 and the computing device platform 100. The frame format of the example AP data frame 110 includes a MAC header field 114, a timestamp field 116, a beacon interval field 118, capability information field 120, a service set identifier (SSID) field 122, a supported rates field 124, a traffic indication map (TIM) element 126, optional fields 128, and a frame check sequence (FCS) 130. For clarification purposes, data frames, including the AP data frame 110 and the modem data frame 112, include information fields and information elements. An information field is a fixed-length mandatory field in the frame body and an information element is a variable-in-length element in the frame body.

The example MAC header field 114 is a three-byte address field indicative of a source address, a source port, a destination address, a destination port, and a protocol. In some examples, the MAC header 114 informs the computing device platform 100 from where network data originates and for what computing resource the network data is intended.

The frame body of the example AP data frame 110 includes the example timestamp 116 which is an eight-byte value indicative of the time on the wireless network device 104, which is the number of microseconds the wireless network device 104 has been active.

The frame body of the example AP data frame 110 includes the example beacon interval 118, which is a two-byte field indicative of a number of time units (TU) between target beacon transmission times (TBTT). For example, the beacon interval 118 determines the period of time between the transmission of the network data from the wireless network device 104 and the receiving of the network data from the wireless network device 104 at the computing device platform 100. In some examples, the default beacon interval value is 100 TU, which corresponds to approximately 102.4 milliseconds.

The frame body of the example AP data frame 110 includes the example capability information field 120, which is a two-byte field including a number of subfields that are used to indicate requested or advertised optional capabilities of the wireless network device 104. For example, the capability information field 120 includes, but is not limited to, subfields corresponding to immediate block acknowledgement of the wireless network device 104, delayed block acknowledgement of the wireless network device 104, Quality of Service (QoS) support of the wireless network device 104, privacy of the wireless network device 104, etc.

The frame body of the example AP data frame 110 includes the example SSID element 122, which is a variable-sized element indicating the name of the wireless network device 104. For example, the SSID element is a distinguishable identifier that informs the computing device platform 100 of the name of the wireless network device 104. In some examples, the SSID element 122 is used by a user of the computing device platform 100 to connect to the correct and secure wireless network.

The frame body of the example AP data frame 110 includes the example supported rates element 124, which is a variable-sized element (e.g., varies in bit length) indicative of a supported frequency rate and/or data rate of the example wireless network device 104. For example, the supported rates element 124 identifies the number of bits per second that the wireless network device 104 can transmit and receive. In some examples, the supported rates element 124 assists the computing device platform 100 in determining the speed at which network data will be and/or can be received in the wireless network system.

The frame body of the example AP data frame 110 includes the example TIM element 126, which is a variable-sized element indicative of network data packets buffered in the example buffer 108. For example, the TIM element 126 advertises to the computing device platform 100 if the computing device platform 100 includes associated network data packets buffered in the buffer 108. In some examples, the computing device platform 100 wakes up every beacon interval (e.g., set by the beacon interval field 118) to check the TIM element 126 to determine if the computing device platform 100 is to obtain network data.

The frame body of the example AP data frame 110 includes the example optional fields 128, which includes additional information corresponding to parameters of the example wireless network device 104. For example, types of optional fields in the AP data frame 110 include, but are not limited to, a frequency hopping parameter element, country information, a power constraint element, a channel switch element, a quiet element, etc.

The example AP data frame 110 includes the frame check sequence element 130 which is indicative of an error detecting code to enable the example computing device 100 to determine if there is an error in the payload of the AP data frame 110. In some examples, the FCS element 130 causes the AP data frame 110 to be terminated. For example, if the destination node (e.g., the computing device platform 100) generates a different FCS than the FCS element in the AP data frame 110, the example AP data frame 110 is discarded by the computing device platform 100.

In FIG. 1, the example modem data frame 112 is an association frame. An association frame is a management frame, managed by a client device (e.g., the computing device platform 100), to obtain an association identifier (AID) from the wireless network device 110 and negotiate and/or communicate network characteristics required by the computing device platform 100. The frame format of the example modem data frame 112 includes a MAC header field 132, a capability information field 134, a listen interval field 136, an SSID field 138, a supported rates field 140, and an FCS field 142.

The example MAC header field 132 is a three-byte address field indicative of a source address, a source port, a destination address, a destination port, and a protocol. In some examples, the MAC header 132 informs the wireless network device 104 of the destination of the data generated at the computing device platform 100.

The frame body of the example modem data frame 112 includes the example capability information field 134, which is a two-byte field including a number of subfields that are used to indicate requested or advertised optional capabilities of the computing device platform 100. For example, the capability information field 134 includes, but is not limited to, subfields corresponding to power capability of the computing device platform 100, supported channels of the computing device platform 100, QoS capability of the computing device platform 100, QoS traffic capability of the computing device platform 100, TIM Broadcast Request for the computing device platform 100, etc. In some examples, the subfields of the capability information field 134 are populated when the AP data frame 110 confirms, via the capability information field 120, that the wireless network device 104 supports such capabilities.

The frame body of the example modem data frame 112 includes the example listen interval field 136 to indicate to the example wireless network device 104 the target wait time of the computing device platform 100. For example, the listen interval field 136 indicates to the wireless network device 104 how often the computing device platform 100 wakes to listen to (e.g., retrieve) beacon management frames (e.g., AP data frames 110). In some examples, the listen interval field 136 is expressed in units of beacon intervals. For example, the listen interval field 136 may indicate that the computing device 100 will enter a power execution state every three beacon intervals (102.4 ms) to retrieve AP data frames 110 and associated network data from the wireless network device 104. In some examples, the wireless network device 104 determines a length of time to buffer network data packets based on the listen interval field 136.

The frame body of the example modem data frame 112 includes the example SSID element 138, which is a variable-sized element indicating the name of the wireless network device 104 that has been associated with the computing device platform 100. For example, the SSID element 138 confirms an association between the wireless network device 104 and the computing device platform 100.

The frame body of the example modem data frame 112 includes the example supported rates element 140, which is a variable-sized element indicative of the supported frequency rate and/or data rate of the example wireless network device 104. For example, the computing device platform 100 confirms the supported rate of the wireless network device 104 when the computing device platform 100 is associated with the wireless network device 104.

The example modem data frame 112 includes the frame check sequence element 142, which is indicative of an error detecting code to enable the example wireless network device 104 to determine if there is an error in the payload of the modem data frame 112.

In FIG. 1, the example wireless network device 104 includes the example buffer 108 to store and allocate network data from the example network 102. In some examples, the buffer 108 is a cache memory, one or more hardware latches, and/or any suitable memory for storing network data. The example buffer 108 is controlled by the example wake-up controller 106, such that the wake-up controller 106 determines when network data is to be stored at the example buffer 108 and when the network data is to be allocated and provided to the example computing device platform 100. In some examples, the wake-up controller 106 analyzes the modem data frame 112 to identify the listen interval field 136 for determining how long to store the network data in the buffer 108. In examples disclosed herein, the computing device platform 100 populates the modem data frame 112 (e.g., populated the listen interval field 136) with a buffer time (e.g., the amount of time the buffer 108 is to buffer network data) based on a class of network data (e.g., QoS class, workload class, etc.) and a user preference (e.g., whether a user prefers power saving or performance of the computing device platform 100).

Figure 2:
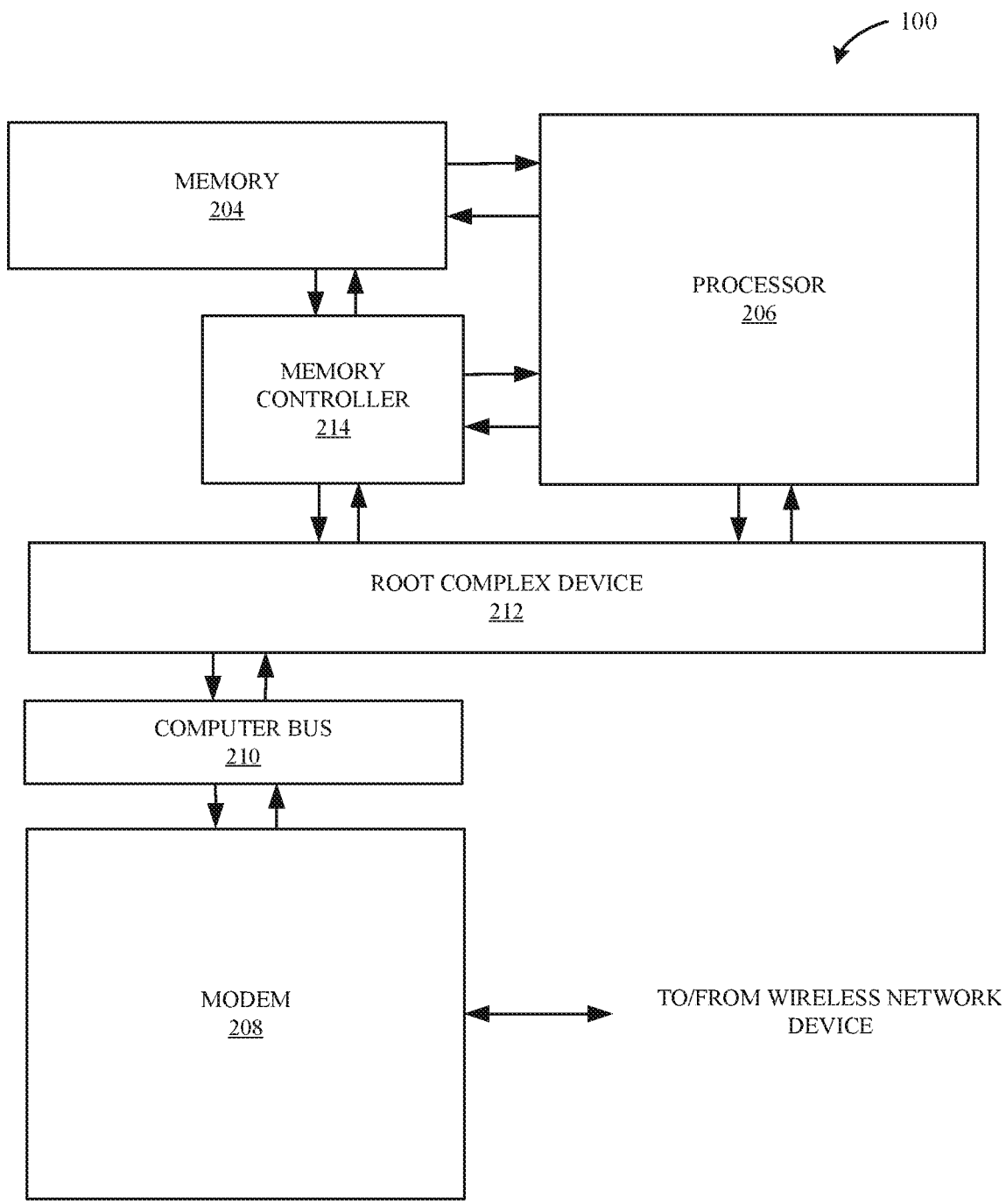
FIG. 2 is a block diagram of the example computing device platform of FIG. 1 to generate dynamic latency values based on network traffic.

FIG. 2 is a block diagram of the example computing device platform 100 of FIG. 1 to generate dynamic latency values and dynamic interrupt triggers based on network traffic and coordinate target wait times between the wireless network device 104 and computing device platform 100 based on the network traffic and user requirements. As used herein, network traffic, network data, network packet data, incoming network data, and packet data are terms that are defined as data, received from an example network 102, that is to be stored in an example memory 204 and executed by an example processor 206 to perform an example operation. As used herein, interrupt triggers, interrupts, and an interrupt trigger are terms that are defined as events generated to access memory 204 of the computing device platform 100 for providing network data. The example computing device platform 100 includes the example memory 204, the example processor 206, an example modem 208, an example local computer bus 210, an example root complex device 212, and an example memory controller 214.

In FIG. 2, the example computing device platform 100 includes the example memory 204 to store network data for subsequent execution by the example processor 206. The example memory 204 may be any suitable memory, such as volatile random access memory (RAM), cache memory, etc. The example memory 204 is connected to the example processor 206 and the example memory controller 214 to store and allocate data.

In FIG. 2, the example computing device platform 100 includes the example processor 206 to perform workload execution of network data. The example processor 206 may be a CPU, an FPGA, a GPU, an accelerator, and/or any other type of hardware that executes workloads. The example processor 206 includes multiple power modes, which are collectively called "C-states" or "C-modes." The C-states enable the example processor 206 to enter into particular power saving modes. For example, a first C-state (C0) is indicative that the processor 206 is operating using full power. A second C-state (C1) is indicative that only a portion of the example processor 206 is operating with full power but a different portion is turned off (e.g., not provided power). A third C-state (C2) is indicative that more than half of hardware in the example processor 206 is turned off but a smaller portion of the processor hardware is still operating. A fourth C-state (C3) is indicative that the example processor 206 is in a sleep state (e.g., the hardware is turned off and power supplied to the processor 206 is reduced). In some examples, the processor 206 enters different C-states corresponding to different power saving levels not described above. When the example processor 206 enters a C-state greater than the first C-state, power consumption of the example computing device platform 100 is reduced, thus saving battery life. The example processor 206 is informed of the level of C-state to enter based on the type of workloads the processor 206 is to execute and based on user requirements selected for the workload and/or computing device platform 100. For example, the C-state is determined based on latency values, where the greater the latency value, the greater the C-state and thus less power consumed.

In FIG. 2, the example computing device platform 100 includes the example modem 208 to mediate data communication between the example network 102 and the example processor 206 as well as coordinate data exchange between the example modem 208 and the example wireless network device 104 of FIG. 1. The example modem 208 may transform network data into information readable and executable by the example processor 206. The example modem 208 may determine types of network data (e.g., workload and traffic type) being received and generate messages (e.g., latency value messages for the processor 206 and target wait time messages for the wireless network device 104) that facilitate a coordination of the network data based on the types determined. Additionally and/or alternatively, the example processor 206 (e.g., CPU, FGPA, etc.) may determine the types of network data being received and provide the types to the modem 208 for generation of latency messages. The example modem 208 may buffer network data to allow the example processor 206 to enter into different C-states. The example modem 208 may generate interrupts to wake the memory 204 and processor 206 for retrieving the network data. In some examples, the modem 208 is a network interface card (NIC). Additionally and/or alternatively, the modem 208 may be any suitable hardware and/or software interface that mediates data communication (e.g., coordinates buffering and interrupting) between the example wireless network device 104, the example modem 208, and the example processor 206. The example modem 208 can be in different states depending on different states of the example computing device platform 100 (e.g., on or off). When the example computing device platform 100 is on, the example modem 208 can be in a sleep state, an idle state, or an active state. The states of the example modem 208 also depend on the network traffic from the example wireless network device 104 and/or more generally, the example network 102. For example, the modem 208 is active when the modem 208 receives data from the network 102, when the modem 208 sends data to the memory 204, when the modem 208 sends data to a different computing device via the network 102, etc. The example modem 208 is idle when the modem 208 buffers data from the example network 102, when the modem 208 does not include network data to send to the network 102 via the wireless network device 104, when the modem 208 does not have network data to receive from the network 102 via the wireless network device 104, etc. The example modem 208 is in a sleep state when the example modem 208 is not receiving data from the example network 102 and/or from the example memory 204, when the example computing device platform 100 is off, etc. In some examples, the state of the modem 208 is associated with the C-states of the processor 206.

In some examples, the modem 208 is implemented at an edge device. For example, processing tasks (e.g., the functionality, operations, etc.) of the modem 208 may be offloaded to an edge device. In other examples, the modem 208 is implemented at a cloud platform. For example, processing tasks of the modem 208 may be offloaded and/or virtualized at a cloud platform. In such examples, the modem 208 reduces the processing power consumption consumed at the computing device platform 100 and the processing tasks operating (e.g., executing) at the computing device platform 100. The example modem 208 is described in further detail below in connection with FIGS. 3, 4, and 9.

In FIG. 2, the example computing device platform 100 includes the example computer bus 210 to connect the example modem 208 to the example memory controller 214, and the example processor 206. The example computer bus 210 facilitates communication between the modem 208 and the other devices of the example computing device platform 100. For example, the computer bus 210 obtains notifications, messages, information, data, etc., from the modem 208 and directs the data to the appropriate hardware components of the computing device platform 100. In some examples, the computer bus 210 is included in the modem 208. Additionally and/or alternatively, the example computing device platform 100 includes any number of computer busses 210 to connect different hardware components of the computing device platform 100. The example computer bus 210 is a peripheral component interconnect express (PCI-e) device. Additionally and/or alternatively, the example computer bus 210 is an accelerated graphics port (AGP), a peripheral component interconnect extended (PCI-X) device, and/or any other suitable bus for the example processor 206.

In FIG. 2, the example computing device platform 100 includes the example root complex device 212 to connect the example memory 204 and the example processor 206 to the example computer bus 210. The example root complex device 212 generates transaction requests on behalf of the example processor 206, which is interconnected through a local bus. The example root complex device 212 may be a root complex functionality implemented as a discrete device or integrated with the example processor 206. In some examples, the root complex device 212 may be a host bridge that interfaces the host (e.g., the processor 206) with the computer bus 210.

In FIG. 2, the example computing device platform 100 includes the example memory controller 214 to store and retrieve data from the example memory 204 based on instructions from the example processor 206 and/or the example modem 208. For example, the memory controller 214 includes logic that reads an input (e.g., instructions) and manages data storage and eviction based on the input. In some examples, the modem 208 instructs the memory controller 214 to give network data to the processor 206, halt communications with the processor 206, etc.

Figure 3:
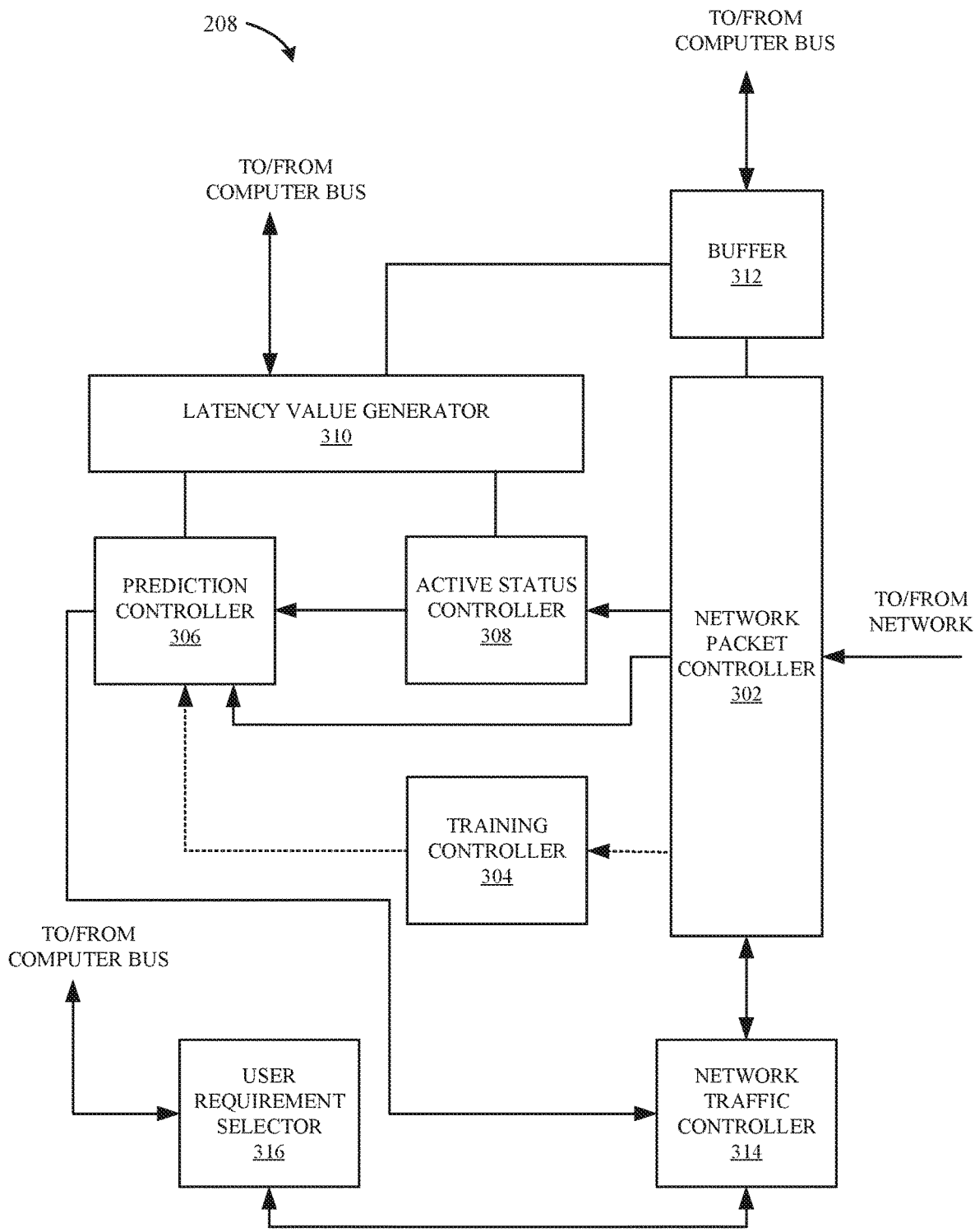
FIG. 3 is a block diagram of an example modem of the example computing device platform of FIG. 2 to generate the dynamic latency values based on network traffic.

Turning to FIG. 3, a block diagram of the example modem 208 to generate latency values based on data from the example network 102 is illustrated. The example modem 208 includes an example network packet controller 302, an example training controller 304, an example prediction controller 306, an example active status controller 308, an example latency value generator 310, an example buffer 312, an example network traffic controller 314, and an example user requirement selector 316. The dotted flow lines represent the training phase to train a model to predict workload types based on the network data packets. For example, the operations performed by the network packet controller 302 and the training controller 304 occur in a learning and/or training phase of the computing device platform 100. The solid flow lines represent the inference phase to predict the workload types based on the trained model. For example, the operations performed by the network packet controller 302, the active status controller 308, the prediction controller 306, the latency value generator 310, the network traffic controller 314, and the user requirement selector 316 occur in an inferring and/or predicting phase. It should be understood that the operations described below in connection with the example modem 208 can be performed in connection with the example processor 206 of FIG. 2. For example, the processor 206 may include the example network packet controller 302, the example training controller 304, the example prediction controller 306, the example active status controller 308, the example latency value generator 310, the example buffer 312, the example network traffic controller 314, and the example user requirement selector 316. In such an example, a modem, such as the modem 208, may not include the processing capabilities and/or hardware to execute the operations described below and, thus, the processor 206 (e.g., a CPU, FPGA, GPU, and/or any other type of accelerator) performs the operations of training a model, inferring workload and traffic types of the network data packets, generating latency values, and communicating buffer times with the wireless network device 104 among other operations.

In FIG. 3, the example modem 208 includes the example network packet controller 302 to control network data packet flows coming in from the example wireless network device 104. A network data packet is a formatted unit of data carried by the wireless network device 104 that consists of a payload (e.g., control information and user data) and five tuples: a source address, a source port, a destination address, a destination port, and a protocol. For example, the network data packet includes a similar format as the AP data frame 110 of FIG. 1, where the payload is the frame body and the five tuples are the MAC header 114. The example network packet controller 302 may identify and/or separate network data packets belonging to different tuples. For example, the network packet controller 302 collects network data packets that may correspond to different workloads (e.g., the computing device platform may be running an email application and a conference call simultaneously). The example network packet controller 302 can identify the different network data packets based on the five tuples (e.g., the MAC header 114), wherein if a first network data packet and a second network data packet have matching tuples, then the network data packets correspond to the same workload. The example network packet controller 302 operates in a training mode or an inference mode. For example, in training mode, the network packet controller 302 passes the network data packets to the training controller 304. In other examples, in inference mode, the network packet controller 302 passes the network data packets to the prediction controller 306 (e.g., via the active status controller 308 or other means of wireless and/or wired communication). The example network packet controller 302 of FIG. 3 may implement means for controlling. The controlling means is hardware including at least one processor.

In FIG. 3, the example modem 208 includes the example training controller 304 to train a model to classify network data packets into a workload type category. The example training controller 304 obtains network data packets from the example network packet controller 302 and pre-processes the network data packets into samples with assigned labels, the samples related to a single network flow (e.g., a workload) and including multiple packet features. The example training controller 304 inputs the samples into an example neural network to enable the model to learn, through the features of the samples and assigned labels, to what type of workload the network data packet corresponds. For example, the training controller 304 classifies network data packets into a video category, a gaming category, an audio category, a streaming category, a batch category, an analytics category, and/or a transactional category. Additionally, the example training controller 304 may include more categories than the ones listed above. Once trained, the example training controller 304 generates and publishes the trained model and provides the model to the example prediction controller 306. The example training controller 304 is described in further detail below in connection with FIG. 4. The example training controller 304 of FIG. 3 may implement means for generating. The generating means is hardware including at least one processor.

In FIG. 3, the example modem 208 includes the example prediction controller 306 to categorize network data packets into workload types and assign the network data packets corresponding labels. The example prediction controller 306 operates in an inference mode such that the example prediction controller 306 obtains network data packets from the example network packet controller 302 in real time, meaning that the prediction controller 306 obtains current (e.g., up-to-date) network data packets. The example prediction controller 306 assigns priority labels, along with workload category labels, to the network data packets based on the classification. For example, the prediction controller 306 analyzes information included in the network data packets (e.g., capability information field 120 and/or optional field 128 of the AP data frame 110) corresponding to priority requirements (e.g., Quality of Service (QoS)) of the workload to assign priority levels to the network data packets. For example, a first network data packet classified into the gaming category corresponds to a high level priority relative to a second network data packet classified into a batch category. The levels of priority correspond to the time and performance requirements of the workload. For example, a voice call (e.g., in an audio category) requires minimum latency and high performance from the memory 204 and processor 206 relative to an email (e.g. in the batch category) that does not require such high performance and/or minimum latency from the memory 204 and the processor 206. In some examples, the prediction controller 306 assigns workload category labels (e.g., workload type labels) and identifies priority labels (e.g., QoS label) tagged in the frame body of the network data packets. Some network data packets include such priority labels and some network data packets do not. Therefore, the example prediction controller 306 is to determine priority labels, based on the workload category, when the network data packets do not include the priority information. In some examples, the prediction controller 306 identifies more than one workload category for more than one network data packet received at the network packet controller 302. For example, the prediction controller 306 receives inputs of data packets belonging to a single network flow but analyzes multiple network flows that may be running at the processor 206 simultaneously. In such an example, the prediction controller 306 assists in identifying which network flows to buffer and which to not buffer, based on workload categories and priority labels. In some examples, the prediction controller 306 outputs classification and labelled network data packets to the example latency value generator 310. In some examples, the prediction controller 306 is triggered by the active status controller 308 to make network data packet predictions. The example prediction controller 306 of FIG. 3 may implement means for predicting. The predicting means is hardware including at least one processor.

In FIG. 3, the example modem 208 includes the example active status controller 308 to determine the state of the modem 208. The example active status controller 308 can determine whether the example modem 208 is active, idle, or inactive. For example, the active status controller 308 can obtain information from hardware registers of the modem 208 indicating the state of the modem 208. In other examples, the active status controller 308 can query the root complex device 212 of FIG. 2 for information regarding the state of the processor 206 of FIG. 2 (e.g., on or off), which corresponds to and/or is associated with the state of the modem 208. In some examples, the active status controller 308 updates each time the state of the modem 208 updates. In some examples, the active status controller 308 sends a trigger to the prediction controller 306 when the modem 208 is in an active state. The example active status controller 308 of FIG. 3 may implement means for determining. The determining means is hardware including at least one processor.

In FIG. 3, the example modem 208 includes the example latency value generator 310 to generate latency values based on the classification and/or labels of network data packets. The example latency value generator 310 may determine appropriate latency values for different workloads. As mentioned above, a latency value is a value of time that the example processor 206 can enter a power saving C-state (e.g., C1, C2, C3, etc.). Additionally, the latency value corresponds to a value of time that the example modem 208 is to buffer network packet data. In some examples, the latency value facilitates the modem 208 to determine a time for the wireless network device 104 to buffer network packet data. In such an example, the modem 208 and consequently the entire computing device platform 100 may enter a power saving state until the modem 208 wakes to receive the buffered data from the wireless network device 104. In some examples, the amount of time that the example modem 208 is to buffer network packet data corresponds to interrupt coalescing (e.g., holding back interrupts to memory 204 and/or the processor 206). For example, when the modem 208 buffers network packet data, the modem 208 is performing interrupt coalescing. In some examples, when the time runs out (e.g., the buffer time), the modem 208 generates an interrupt for the one or more network data packets buffered at the modem 208.

The example latency value generator 310 is in communication with the example computer bus 210, the example prediction controller 306, the example active status controller 308, and the example buffer 312. In some examples, the latency value generator 310 includes pre-defined information regarding what latency values correspond to different workload types. For example, a table that maps workload types to latency values may be stored in a memory (not shown) of the modem 208, the memory 204, etc. In some examples, the latency value generator 310 generates latency values based on the state of the modem 208. For example, the active status controller 308 can trigger the latency value generator 310 to generate high latency values when the modem 208 is in a sleep state and/or an idle state. In some examples, the latency value generator 310 is implemented in hardware of the computing device platform 100 external to the modem 208. For example, the computer bus 210 may implement the example latency value generator 310. The example latency value generator 310 of FIG. 3 may implement means for generating. The generating means is hardware including at least one processor.

In FIG. 3, the example modem 208 includes the example buffer 312 to store network data packets for a period of time specified by the example latency value generator 310. The example buffer 312 may be a cache memory, one or more hardware latches, and/or any suitable memory for storing network data packets. In some examples, the network packet controller 302 stores the network data packets in the buffer 312 and the buffer 312 evicts the network data packets to the memory 204 pending an instruction from the latency value generator 310. Such an instruction may include an interrupt to wake the memory 204 and/or processor 206 for receiving the network data packets. In other examples, the wireless network device 104 buffers the network data packets and, thus, the buffer 312 does not buffer the network data packets.

In FIG. 3, the example modem 208 includes the example network traffic controller 314 to generate target wait time parameters and/or skip time parameters based on the workload requirements (e.g., priority requirements) and user requirements. As used herein, a target wait time parameter is a time interval, defined in time units, indicative of when the example modem 208 will wake up to receive network traffic from the example wireless network device 104. As used herein, a skip parameter corresponds to a number of times the example modem 208 will skip a beacon interval (e.g., not retrieve a network packet). The example network traffic controller 314 receives predictions from the example prediction controller 306 to determine target wait time parameters and/or skip parameters. In some examples, the network traffic controller 314 receives latency values from the latency value generator 310 to determine target wait time parameters and/or skip parameters. The example network traffic controller 314 is in communication with the wireless network device 104 via the example network packet controller 302. For example, the network traffic controller 314 negotiates target wait time parameters and/or skip time parameters with the wireless network device 104 via the network packet controller 302. In some examples, the network traffic controller 314 generates populated data frames, including the target wait time parameter, to negotiate wait times with the wireless network device 104. Such wait times (e.g., target wait times and skip times) are determined based on a balance between power consumption and performance and/or more specifically, workload requirements and user requirements. The example network traffic controller 314 facilitates a non-random nature of Wi-Fi such that appropriate coordination between the example wireless network device 104 and the computing device platform 100 exists. The example network traffic controller 314 is described in further detail below in connection with FIG. 9.

In FIG. 3, the example modem 208 includes the example user requirement selector 316 to select and update a user requirement status of the computing device platform 100. The example user requirement selector 316 interfaces with the example computer bus 210 to retrieve user input from the example processor 206 and/or the example memory 204. In some examples, the processor 206 and/or the example memory 204 receives, from a display of the computing device platform 100, information regarding user requirements. As used herein, a user requirement is a preference, determined by a user of the computing device platform 100, between saving battery life and optimal performance. In some examples, the preferences include a ratio favoring power saving, a ratio favoring performance enhancing, an equal ratio between power saving and performance enhancing, and/or other ratios between power consumption and performance. A ratio may favor one preference over a different preference and/or may favor both preferences equally.

For example, the user may indicate, via a user interface such as a display bar, that the computing device 100 is to optimize 70% for power saving and 30% for workload performance. In such an example, the user may be on an airplane, with no access to a charging station, while trying to meet a work deadline. In a different example, the user may indicate, via the user interface such as the display of the computing device platform 100, that the computing device 100 is to optimize 65% for workload performance and 35% for power saving. In such an example, the user may be on an airplane watching a movie that the user has seen before and therefore plans to take a nap or read a book once the movie is over. These user requirements inform the modem 208, and more specifically the example network traffic controller 314, how to select target wait time values or skip time values. Therefore, the example user requirement selector 316 sends status updates, corresponding to the user requirement status, to the example network traffic controller 314 for use in determining target wait time parameters and/or skip time parameters.

An example training operation of the modem 208 is described below. During the training operation, the example network packet controller 302 obtains data packets from the example wireless network device 104. In some examples, the data packets correspond to one workload and/or different workloads. In some examples, the network packet controller 202 is configured to act as a packet capturer (e.g., packet sniffer) during training mode. For example, the network packet controller 202 may be triggered to capture one or more particular workloads based on a filter (e.g., a filter set by an operator, developer, etc., that filters through network data packets and captures the ones belonging to a particular workload) in order to pre-identify the type of workload for training. For example, the network packet controller 202 is configured to capture types of data packets belonging to the one or more particular workloads. The example network packet controller 302 identifies data packets corresponding to one workload and/or more specifically, a single network flow. A network flow is defined as all data packets (e.g., bi-directional) belonging to the same five tuple (e.g., header). Therefore, the example network packet controller 302 identifies data packets having the same five tuple (e.g., source address, source port, destination address, destination port, and protocol) and collects them, creating a group of data packets corresponding to a workload. The example network packet controller 302 collects data packets corresponding to the same network flow because it can be assumed that the data packets of the same network flow have the same priority requirements (e.g., QoS requirements) and, thus, priority requirements can be identified at the flow level.

The example network packet controller 302 provides the data packets to the example training controller 304 for learning and classifying the data packets into a workload type category. For example, the training controller 304 obtains the data packets grouped together as a single flow and begins the process of pre-processing (e.g., identifying a workload type) the data packets and training a model to identify the workload type without assistance from additional sources (e.g., the pre-processor, a database, program developers, etc.).

The example training controller 304 obtains data packets from the example network packet controller 302 and assigns a priority tag and workload type to the data packets. For example, the training controller 304 may determine the priority tag (e.g., the QoS) based on the frame body of the data packets. Different workloads require defined QoS tags to be executable. Therefore, developers of an application (e.g., a workload) may define, in the application header and/or metadata, the type of quality required to execute the functions of the application. The definition of quality may be implemented in the frame body of the data packets upon transmission through a network (e.g., the network 102), and the example training controller 304 can analyze the frame body and identify the quality of service. The QoS of a workload may be defined by defining minimum and/or maximum values that the computing device platform 100 must meet during execution of the workload. Such values may correspond to packet loss, bit rate, throughput, jitter, transmission delay, latency, availability, etc. For example, voice call workloads may require that the computing device platform 100 executes the workload with minimum packet loss and transmission delay as well as high throughput and bit rate. In some examples, the priority tag (e.g., QoS tag) is a numerical value corresponding to a ranking, where a lower value is indicative that the workload does not require a high level of service and a higher value is indicative that the workload requires a high level of service. In some examples, an application and/or software developer may not define priority requirements or the wireless network device 104 may not support priority field capabilities in the data packets. In such an example, the training controller 304 may identify the priority tag (e.g., priority requirement) based on the workload type.

The example training controller 304 obtains data packets from the example network packet controller 302 (e.g., including and/or excluding the QoS tag) and selects n packet samples from the data packets corresponding to the same network flow (e.g., workload), where n is a number of data packets. For example, the training controller 304 determines the n number of packet samples based on the computational capabilities of the modem 208. For example, modem 208 can be of any size and include any number of hardware components that can process data up to a particular amount and a certain speed. Therefore, n is selected based on hardware and/or software features of the example modem 208.

In some examples, the network packet controller 302 selects n packet samples to provide to the training controller 304. In some examples, the network packet controller 302 assigns the workload label to the n packet samples prior to providing the samples to the training controller 304 based on packet traces captured for that workload. For example, the filters set for the network packet controller 302 during training mode may facilitate storage and/or saving of packet traces in particular files based on the packets' characteristics, where the files are named based on the workload type. For example, file packet audio streaming may include and/or otherwise contain packet samples corresponding to an audio streaming workload.

The example training controller 304 extracts f packet features from the n samples, where f is the number of features of one of the n packet samples. The example training controller 304 assigns workload labels to the n packet samples and the f features based on the packet traces captured for that workload.

When the example training controller 304 tags and/or assigns labels to the n packet samples, the example training controller 304 trains a model with the n packet samples and f features. For example, the training controller 304 inputs the labelled n packet samples with corresponding f features and associates the f features with the workload types. The example training controller 304 inputs multiple sets of n packet samples corresponding to different workloads during training. The example training controller 304 may pause training to evaluate and/or test the model against a random data set (e.g., randomly selected data packets). For example, the training controller 304 may utilize K-Fold Cross validation by splitting the data set into a K number of sections/folds where each fold is used as a testing set at some point. When testing and evaluation of the model evaluates that a certain amount of error has been achieved, the example training controller 304 publishes the model and provides the published model to the example prediction controller 306.

Figure 4:
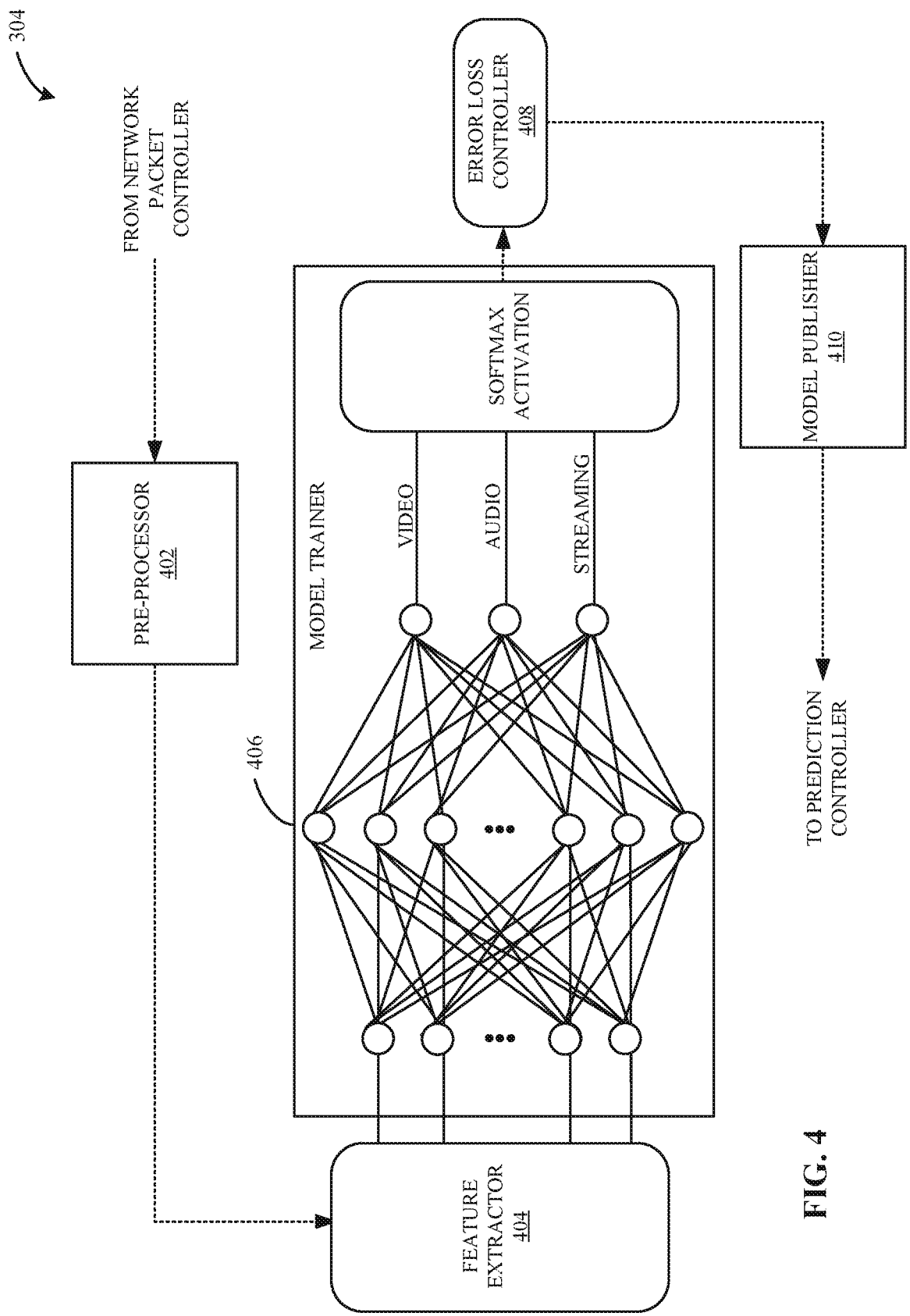
FIG. 4 is a block diagram of an example training controller of the example modem of FIGS. 2 and 3 to train a model to classify network data packets into workload categories.

Turning to FIG. 4, a block diagram of the example training controller 304 is illustrated to train the model to classify data packets into workload categories. The example training controller 304 includes an example pre-processor 402, an example feature extractor 404, an example model trainer 406, an example error loss controller 408, and an example model publisher 410.

In FIG. 4, the example training controller 304 includes the example pre-processor 402 to assign labels to data packets. The example pre-processor 402 obtains data packets from the example network packet controller 302 and selects n data packets, belonging to a single network flow, to use as input samples. In some examples, the pre-processor 302 obtains n data packets from the network packet controller 202. The example pre-processor 302 assigns the workload label to the n packet samples based on the packet traces and/or information corresponding to the packet traces captured by the example network packet controller 202.

The example pre-processor 402 extracts f features from the n packet samples. For example, the pre-processor 402 may extract features such as packet length, inter-arrival time, packet direction, and QoS tags. The example pre-processor 402 may extract any other statistical features and/or characteristics from the packet samples that are useful in identifying the type of workload. In some examples, the pre-processor 402 can extract features corresponding to a header and/or frame body of the packet samples. The header of packet samples can be useful for the model trainer 306 in determining the workload type. For example, an email packet may include a particular protocol identifier (e.g., indicated in the optional field element 128 of the AP data frame 110) that is specific to email. In other examples, the pre-processor 402 extracts features corresponding to the inter-packet arrival times of the packet samples which can be useful for the model trainer 406 in determining the workload type. For example, the inter-packet arrival times can be used to infer that the packet samples correspond to an audio workload category. For example, if data packets are being sent to the modem 208 on average every 20 milliseconds (ms), the inter-packet arrival time of the n packet samples may be equal to approximately 20 ms with some standard deviation. In such an example, packet samples having an inter-packet arrival time equal to approximately 20 ms may correspond to an audio category. Additionally, if the packet samples are relatively small in length (e.g., bit length) and have an inter-packet arrival time of 20 ms, then the packet samples correspond to the audio category.

In FIG. 4, the example pre-processor 402 assigns the identified workload category label (e.g., identified by the packet traces captured) to the n packet samples and then provides the labeled packet samples to the example feature extractor 404. In some examples, the pre-processor 402 appends and/or prepends metadata to the n packet samples including a string of characters or some other type of identifier. Additionally, the example pre-processor 402 may tag the n packet samples with a priority tag (e.g., a QoS tag) corresponding to the priority requirements of the network flow. In some examples, the pre-processor 402 obtains second, third, fourth, fifth, etc., sets of data packets from the network packet controller 302, corresponding to different network flows, and selects n packet samples and f features to which workload labels are assigned.

In FIG. 4, the example training controller 304 includes the example feature extractor 404 to generate a feature vector based on pre-processed packet samples and features from the example pre-processor 402. The example feature extractor 404 generates or builds derived values of feature vectors (e.g., representative of f features in n packet samples) that are to be informative and non-redundant to facilitate the training phase of the training controller 304. As used herein, a feature vector is an n-dimensional array (e.g., a vector) of features that represent some workload category. For example, a feature could be one of the f features such as inter-packet arrival time, protocol identifier, packet direction, source and destination, packet length (e.g., bit size), QoS, etc. The example feature extractor 404 reduces processed input data (e.g., the n packet samples from the pre-processor 402) into more manageable groups (e.g., features) for processing, while describing the original network flow (e.g., data packets) with sufficient completeness and accuracy. In the illustrated example of FIG. 4, the feature extractor 404 identifies features in data packets corresponding to their intended operation (e.g., workload). The feature data provided by the pre-processor 402 facilitates the model trainer 406 in training a model to classify a data packet into a workload category. For example, the network packet controller 302 of FIG. 3 captures a plurality of network data packets from the wireless network device 104 corresponding to a video call. In such an example, the feature extractor 404 extracts data packet features and generates vectors for the data packets and provides the vectors to the model trainer 406. In some examples, the feature extractor 404 may extract a plurality of features corresponding to large sets of input data, it may extract fewer features corresponding to a smaller set of input data, etc. The number off features corresponds to the computational capabilities of the example computing device platform 100. After the example feature extractor 404 extracts features of the packet samples, the example feature extractor 404 outputs a feature vector.

In FIG. 4, the example training controller 304 includes the example model trainer 406 to train a model based on the output feature vector(s) of the feature extractor 404. The example model trainer 406 operates in a training mode where it receives a plurality of pre-processed packet samples (e.g., feature vector(s)), generates a prediction, and outputs a model based on that prediction. For the example model trainer 406 to generate a model, the model trainer 406 receives feature vectors corresponding to pre-processed and known packet samples. For example, during a training mode, confirmations are made that the packet samples correspond to a specific workload (e.g., n packet samples are labelled with a workload type tag) so that the data packets are suitable for learning. For example, the model trainer 406 receives a feature vector indicative of the features of the packet samples and identifies a pattern in the features of the packet samples that maps the features of the packet samples to the workload category and outputs a model that captures these patterns. The example model trainer 406 provides the output model to the example error loss controller 408 to evaluate the model.

In some examples, the model trainer 406 implements an activation function, such as a rectified linear unit (ReLU), to help the model account for interaction effects and non-linear effects. An interaction effect is when one variable A affects a prediction (e.g., a workload type prediction) differently depending on the value of B. Non-linear effects correspond to increasing the value of an input and the output not increasing at the same rate or a decreasing value of an input that does not cause the output to decrease at the same rate.

The activation function may include a plurality of activation layers that output a prediction vector to a softmax activation function. Such an output may be a fully connected vector including values indicative of likelihoods that the n packet samples correspond to a video workload, an audio workload, or a streaming workload. Additionally, the values may be indicative of likelihoods that the n packet samples correspond to additional workload such as web browsing, file downloading, etc. The softmax activation function is a function that takes an input vector (e.g., the prediction vector, a fully connected vector, etc.) consisting of K real numbers and normalizes the input vector into a probability distribution consisting of K probabilities proportional to the exponentials of the K real numbers. Put more simply, the output of the softmax activation function enables the output vectors of the activation function to be interpreted as probabilities by normalizing the real numbers to values between 0 and 1. The example model trainer 406 may implement any other method of learning how to classify data packets into a workload category. In examples described herein, the model trainer 406 identifies three categories: video, audio, and streaming. However, the example model trainer 306 and/or more generally the example training controller 304 is not limited to the above-mentioned three categories and can identify any number of workload types.

In FIG. 4, the example training controller 304 includes the example error loss controller 408 to evaluate the performance of the classification model. In some examples, the error loss controller 408 implements cross-entropy loss. In cross-entropy loss, the example error loss controller 408 determines that the loss value increases as the predicted probability of workload category diverges from the actual label, assigned by the example pre-processor 402. In cross-entropy loss, a perfect model would have a loss of zero. However, given that there are hundreds of different types of workloads, achieving zero loss may be impractical. Therefore, if the example error loss controller 408 determines that the model includes an acceptable amount of error and/or loss, the model may be ready for publishing. In other examples, if the example error loss controller 408 determines that the model does not meet and/or output probabilities within an acceptable amount of error and/or loss, the example error loss controller 408 may determine that re-training is to be performed by the example model trainer 406. Such re-training may cause the model to adjust weights applied to the n data packets and f features during activation, wherein the adjusted weights may generate a more expected output vector. In some examples, the error loss controller 408 is in communication with the model trainer 406 and the model publisher 410.

In FIG. 4, the example training controller 404 includes the example model publisher 410 to publish the model generated by the example model trainer 406 and provide it to the example prediction controller 306 of FIG. 3. For example, the model publisher 410 receives a model from the model trainer 406 and transforms it into a consumable format for publishing. As used herein, consumable format is defined as a model that is intended to be used and then replaced (e.g., by an updated model). The model publisher 410 transforms the model into a consumable format to constantly update the prediction controller 306 during the training and detecting phase. In some examples, the model publisher 410 determines if the received model is acceptable to publish. For example, the model publisher 410 may receive a new model that corresponds to video, audio, and streaming workload classes, but the model publisher 410 may have previously been provided with a model corresponding to video, audio, and streaming workload classes for which that previous model has not been consumed (e.g., used) by the prediction controller 306. In this example, the model publisher 410 may determine that the new received model cannot be published (e.g., until the previous model is consumed). Other examples in which a model is not acceptable to publish occur when the model publisher 410 is unable to transform the model into a consumable format, and therefore cannot provide the model to the prediction controller 306.

Returning to the example modem 208 of FIG. 3, the modem 208 enters an inference operation when the example training controller 304 outputs a published model to the example prediction controller 306. During inference, the example active status controller 308 checks the status of the modem 208. For example, the active status controller 308 determines if the modem 208 is in a sleep state, an idle state, or an active state. The active status controller 308 checks the status of the modem 208 to determine whether dynamic latency values are to be generated. For example, when the modem 208 is determined to be in a sleep state, the latency value generator 310 does not need to send latency values, thus allowing the processor 206 to enter the deepest possible sleep state. When the example active status controller 308 determines the modem 208 is in an idle state, the example modem notifies the latency value generator 310 and the latency value generator 310 generates latency values corresponding to the maximum amount of time the example buffer 312 can store data. For example, the buffer 312 may operate based on a timer that causes the data stored in the buffer 312 for a threshold period of time to be evicted. In such an example, the threshold period of time is the maximum amount of time the buffer 312 is able to store data. Therefore, when the example modem 208 is idle (e.g., not turned off but not receiving instructions from the processor 206 and/or AP data frames from the wireless network device 104), workloads are not being executed and the modem 208 can buffer data to allow the processor 206 to enter a power saving C-state. When the example active status controller 308 determines that the modem 208 is in the active state (e.g., receiving bi-directional network data packets corresponding to current workloads), the example active status controller 308 notifies the prediction controller 306 to infer workload types.

The example prediction controller 306 may obtain network data packets from the example network packet controller 302 and/or from the example active status controller 308. In some examples, when the prediction controller 306 obtains the network data packets from the network packet controller 302, the network packet controller 302 identifies data packets corresponding to a single network flow and provides them to the prediction controller 306. The example prediction controller 306 inputs the network data packets corresponding to a single network flow to the trained and published model. In some examples, the prediction controller 306 extracts features from the network data packets. The features assist the model in determining a workload class/type of the network flow of data packets. The example prediction controller 306 generates an output probability indicative of likelihoods of the workload class/type. For example, the prediction controller 306 generates a probability value that the network flow is an audio workload, a probability value that the network flow is a video workload, a probability value that the network flow is a streaming workload, etc. In some examples, the workload category with the highest probability value is assigned to the network data packets of the network flow. For example, the prediction controller 306 generates a flag, a message, a notification, etc., that the current network data packets are "streaming" data packets if the network data packets correspond to a streaming workload.

The example prediction controller 306 provides the flag, message, notification, etc., indicative of the current workload type to the example latency value generator 310. The example latency value generator 310 generates one or more latency values based on the output of the prediction controller 306. For example, the latency value generator 310 determines whether the network data packets can be buffered and for how long they can be buffered. In some examples, when the latency value generator 310 determines dynamic buffering of network data packets, the latency value generator 310 also is generating dynamic interrupt coalescing. For example, interrupt coalescing and latency tolerance reporting (e.g., the reporting of latency values) go hand-in-hand, such that if the latency values increase, then interrupt coalescing increases (e.g., the amount of time the modem 208 refrains and/or holds back from sending an interrupt trigger to access memory 204 and/or the processor 206 increases) and therefore buffering increases, and if latency values decrease, then interrupt coalescing and buffering decrease (e.g., the amount of time the modem 208 refrains and/or holds back from sending an interrupt trigger to access memory 204 and/or the processor 206 decreases). Thus, when the example latency value generator 310 generates one or more latency values based on the output of the prediction controller 306, the example latency value generator 310 is also generating times at which to interrupt (e.g., wake) the memory 204 and/or processor 206 from a C-state.

In some examples, the buffering of data packets corresponds to how time sensitive the workload type is and/or what the priority level of the workload type is. Therefore, the example latency value generator 310 determines the sensitivity level of the workload type. For example, the latency value generator 310 determines if the workload is latency sensitive if the workload is periodic (e.g., data packets are sent periodically and require responses in real time) and/or interactive (e.g., where a requestor such as the processor 206 or a different device connected to the network 102 is interested in an immediate response and is generally waiting for the interactive request to be executed before going on to other activities). In other examples, the latency value generator 310 determines if the workload is not latency sensitive. For example, the latency value generator 310 determines if the workload type corresponds to an aperiodic workload (e.g., a non-real-time workload), a non-interactive workload, low throughput workload, a time insensitive workload, etc.

When the example latency value generator 310 infers the sensitivity level of the workload type, the latency value generator 310 makes a decision about the latency value appropriate for the workload type. For example, if the workload is latency sensitive (e.g., time sensitive), the latency value generator 310 generates a short latency value that enables the processor 206 to enter in a first or second power saving state. In some examples, the decision is based on a C-state exit latency of the processor 206 as well as the workload type. An exit latency is the time it takes the processor 206 to leave (e.g., exit) a power saving state and enter a power execution state. The exit latencies are to be considered when determining buffering lengths and generating latency values so that the processor 206 is provided with enough time to awake (e.g., exit the C-state) and retrieve buffered data packets from the buffer 312r. For example, if the latency value generator 310 reads that the processor 206 has an exit latency of 5 ms from the second C-state to the first C-state and determines that data packets can be buffered for 20 ms (e.g., based on the workload type), the latency value generator 310 may generate a latency value of 15 ms in an effort to trigger the processor 206 to exit the second C-state and execute the data packets within 20 ms.

To determine the buffering time of the data packets, the example latency value generator 310 infers the level of sensitivity of the workload. For example, the prediction controller 306 infers that a first set of network data packets corresponding to a first network flow are indicative of a video conference call. In such an example, the latency value generator 310 determines the video call workload is periodic and interactive but not extremely latency sensitive. In this manner, the example latency value generator 310 determines that it is appropriate to buffer the first set of data packets for a small period of time due to the fact that the workload can tolerate a small amount of latency between the modem 208 and the processor 206. In some examples, the latency value generator 310 determines the latency value (e.g., the buffer time) based on features of the first set of data packets. For example, the latency value generator 310 can determine the transmission delay required for the workload based on the priority requirement (e.g., QoS tag) and based the latency value on that minimum allowed delay of packet transmission.

In other examples, the prediction controller 306 infers that a second set of network data packets corresponding to a second network flow are indicative of a video gaming workload. In such an example, the latency value generator 310 determines the video gaming workload is latency sensitive and interactive. In this manner, the example latency value generator 310 determines that buffering the data packets would incur a relatively high amount of performance error and, thus, does not generate latency values. In such an example, the latency value generator 310 may inform the network packet controller 302 to send the network data packets directly to the processor 206 via the computer bus 210 and the root complex device 212.

In yet another example, the prediction controller 306 infers that a third set of network data packets corresponding to a third network flow are indicative of a batch workload. In such an example, the latency value generator 310 determines the batch workload is aperiodic, non-interactive, and not latency sensitive. In this manner, the example latency value generator 310 can generate latency values that buffer the third set of data packets for an appropriate amount of time (e.g., before the batch workload would incur performance errors). The example latency value generator 310 determines the latency value (e.g., and the buffer time) based on features of the third set of data packets. For example, the latency value generator 310 may determine the inter-packet arrival time and base the latency values on the time between packet arrivals. In other examples, the latency value generator 310 may determine the packet length (e.g., bit size) and base the latency values on the throughput required for the packet length.

When the example latency value generator 310 generates the latency value(s), the example latency value generator 310 sends a message to the example root complex device 212, via the example computer bus 210, to inform the processor 206 to enter a particular power saving state or power execution state. In some examples, the latency value generator 310 and/or more generally the modem 208 implements latency tolerance reporting (LTR) to send the latency requirement messages to the processor 206 and memory 204. For example, the LTR mechanism is dynamic due to the implementation of the prediction controller 306, striking a balance between handling latency sensitive network traffic and allowing the processor 206 to sleep (e.g., entering a power saving state) for longer duration.

Additionally, when the example latency value generator 310 generates the latency value(s), the example latency value generator 310 triggers the storage of network data packets in the example buffer 312 (e.g., interrupt coalescing). For example, the latency value generator 310 may initiate a timer, corresponding to the latency value, and the network packet controller 302 may store the data packets in the buffer 312. In some examples, the latency value generator 310 does not trigger data buffering. For example, when the data packets correspond to latency sensitive workloads, the latency value generator 310 triggers the network packet controller 302 to send the data packets to the processor 206 and/or memory 204.

While an example manner of implementing the modem 208 of FIG. 2 is illustrated in FIGS. 3-4, one or more of the elements, processes and/or devices illustrated in FIGS. 3-4 may be combined, divided, re-arranged, omitted, eliminated and/or implemented in any other way. Further, the example network packet controller 302, the example training controller 304, the example prediction controller 306, the example active status controller 308, the example latency value generator 310, the example network traffic controller 314, the example user requirement selector 316, the example pre-processor 402, the example feature extractor 404, the example model trainer 406, the example error loss controller 408, the example model publisher 410, and/or, more generally, the example modem 208 of FIG. 2 may be implemented by hardware, software, firmware and/or any combination of hardware, software and/or firmware. Thus, for example, any of the example network packet controller 302, the example training controller 304, the example prediction controller 306, the example active status controller 308, the example latency value generator 310, the example network traffic controller 314, the example user requirement selector 316, the example pre-processor 402, the example feature extractor 404, the example model trainer 406, the example error loss controller 408, the example model publisher 410, and/or, more generally, the example modem 208 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network packet controller 302, the example training controller 304, the example prediction controller 306, the example active status controller 308, the example latency value generator 310, the example network traffic controller 314, the example user requirement selector 316, the example pre-processor 402, the example feature extractor 404, the example model trainer 406, the example error loss controller 408, and/or the example model publisher 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example modem 208 of FIG. 2 may include one or more elements, processes and/or devices in addition to, or instead of, those illustrated in FIGS. 3-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the modem 208 of FIGS. 2-4 is shown in FIGS. 5-8. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 5-8, many other methods of implementing the example modem 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B.

Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 5:
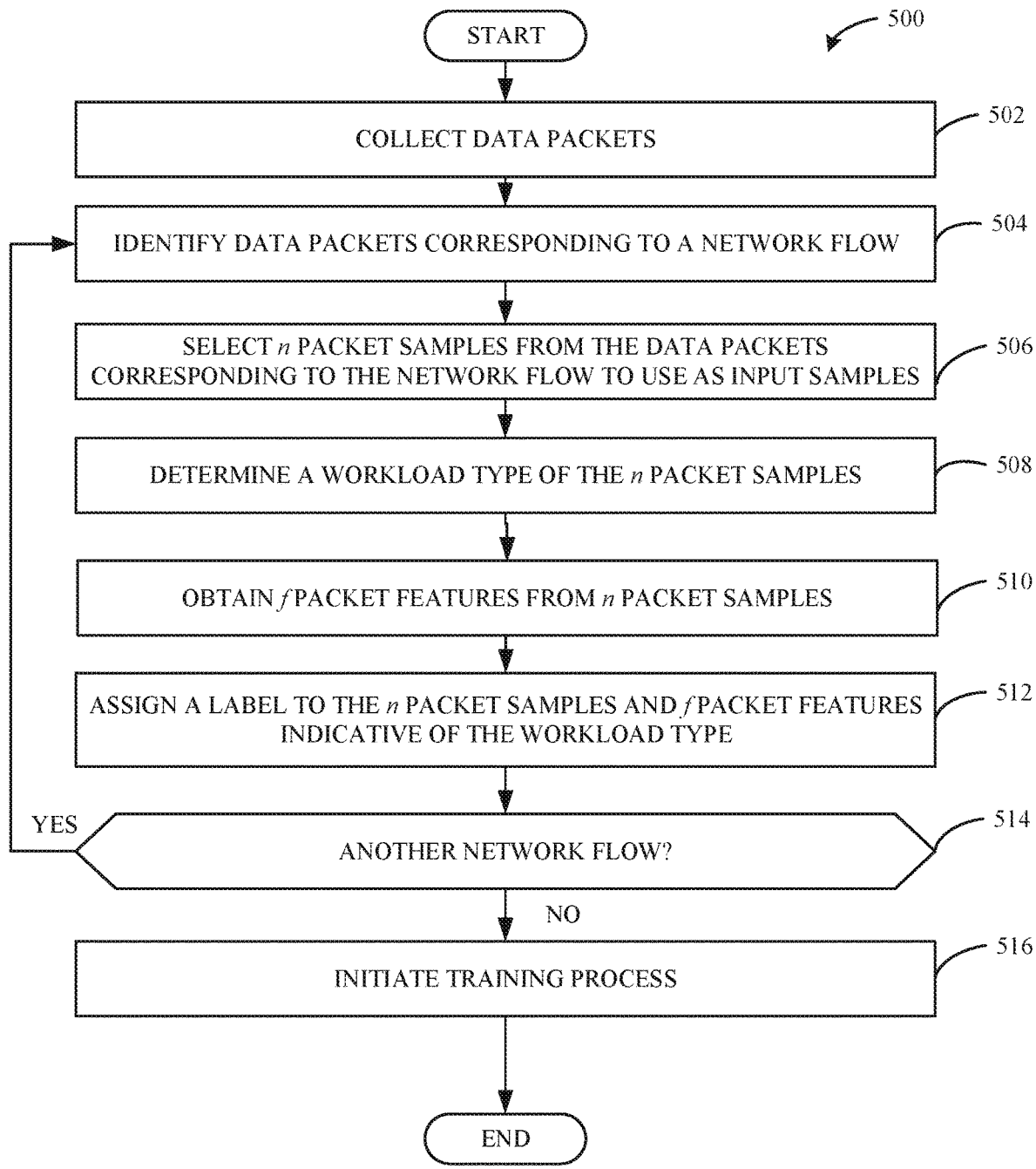
FIGS. 5-6 are flowcharts representative of machine readable instructions which may be executed to implement the example training controller of FIG. 4 to train a model to classify network data packets into workload categories.

FIG. 5 illustrates an example pre-process operation D00 of the example modem 208 of FIGS. 2-4 to assign workload labels to data packets of a single network flow. At block 502, the example network packet controller 302 (FIG. 3) collects data packets from the example wireless network device 104 (FIG. 2). For example, the network packet controller 302 utilizes a Capture Packet Trace feature to intercept data packets between the processor 206 (FIG. 2) and other wireless clients. In some examples, the network packet controller 302 is an interface (e.g., a NIC) that collects network traffic for the example computing device platform 100.

The example network packet controller 302 identifies data packets corresponding to a network flow (block 504). For example, the network packet controller 302 analyzes the header of the data packets to determine matching tuples between the data packets. In such an example, the data packets with matching tuples (e.g., a list of a source address number, a source port number, a destination address number, a destination port number, and a protocol number) belong to the same network flow. In some examples, the Capture Packet Trace feature stores intercepted data packets, belonging to the same network flow, in respective file locations corresponding to a workload category.

The example network packet controller 302 provides the data packets corresponding to a single network flow to the example training controller 304 and/or more specifically, the example pre-process controller 402 (FIG. 4). The example pre-process controller 402 selects n packet samples from the data packets corresponding to the network flow to use as input samples (block 506). For example, the pre-process controller 402 determines a number of data packets that can be analyzed and used to train a model based on the computation capabilities of the modem 208. In some examples, the pre-process controller 402 is provided with a sample limit during implementation (e.g., design and manufacturing). In other examples, the pre-process controller 402 queries hardware registers, modem storage, etc., for information regarding computation capabilities of the example modem 208.

The example pre-process controller 402 determines a workload type of the n packet samples (block 508). For example, the pre-process controller 402 analyzes the file naming, information, and/or other characteristics of the packet traces captured by the network packet controller 302. In some examples, the pre-process controller 402 determines, based on the information corresponding to the packet traces, if the packet samples correspond to real-time workloads, non-real-time workloads, etc. In other examples, the pre-process controller 402 determines if the n packet samples correspond to a more specific workload type, such as video call, file download, gaming, etc.

The example pre-process controller 402 obtains f packet features from the n packet samples (block 510). For example, the pre-process controller 402 analyzes the headers and the frame bodies of the n samples of packets for statistical information, such as inter-packet arrival time, packet direction, protocol identifier, packet length, QoS class, etc. In some examples, the number of features f is selected based on the computational capabilities of the modem 208.

The example pre-process controller 402 assigns a label to the n packet samples and f packet features (block 512). For example, the pre-process controller 402 appends an identifier (e.g., a workload type identifier), such as a character string of meta data, to the n packet samples belonging to the same network flow. In some examples, the label is identifiable by the example feature extractor 404 (FIG. 4) and model trainer 406 (FIG. 4) for training a model to learn the label based on features of the packets.

The example pre-process controller 402 determines if there is another workflow (block 514). For example, the pre-process controller 402 may have received data packets belonging to more than one network flow, separated, and/or grouped together by the network packet controller 302. If the example pre-process controller 402 determines there is another network flow to label (e.g., block 514 returns a value YES), control returns to block 504. For example, the pre-process controller 402 identifies the next set of data packets belonging to a single network flow. If the example pre-process controller 402 determines there is not another network flow to label (e.g., block 514 returns a value NO), the example pre-process controller 402 initiates the training process (block 516). For example, the pre-process controller 402 triggers the feature extractor 404 by sending labelled samples of data packets.

The example pre-process operation 500 ends when the example pre-process controller 402 triggers training of a model. However, the example pre-process operation 500 is repeated when the example network packet controller 302 obtains data packets corresponding to an unidentified network flow.

Figure 6:
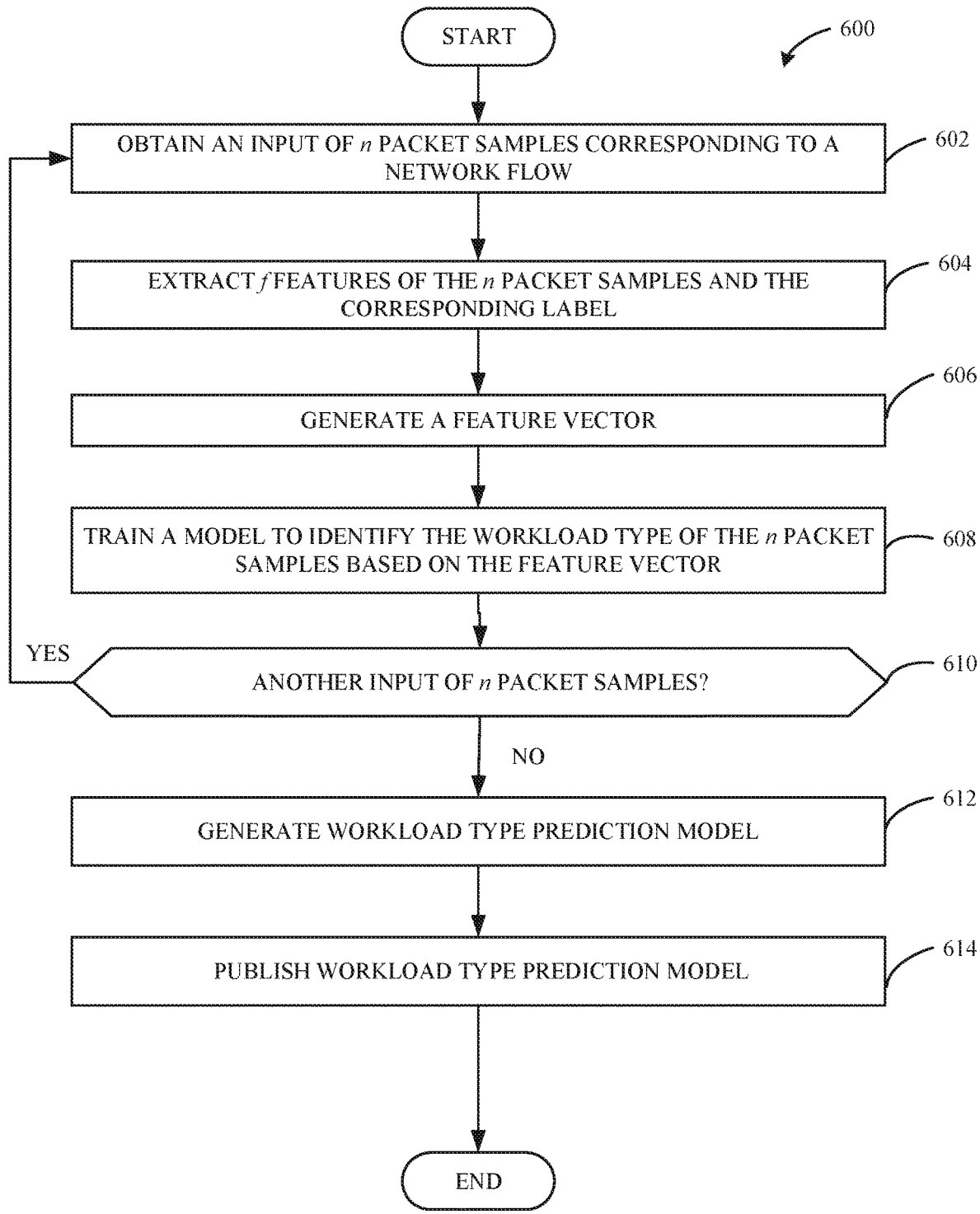

FIG. 6 illustrates an example training operation 600 of the example modem 208 of FIGS. 2-4 to train one or more model(s) to classify data packets into their respective workload categories (e.g., based on pre-processed labels and features). At block 602, the example feature extractor 404 (FIG. 4) obtains an input of n packet samples corresponding to a network flow. For example, the feature extractor 404 obtains n packet samples from the pre-process controller 402 (FIG. 4) that have been labelled with a workload type.

The example feature extractor 404 extracts f features of the n packet samples and the corresponding label (block 604). For example, the feature extractor 404 extracts the f features obtained by the pre-process controller 402, where f is a number of descriptive features describing the statistical characteristics of the n packet samples. Such descriptive features characterize the intended workload of the packet samples. The example feature extractor 404 generates a feature vector (block 606). For example, the feature extractor 404 generates or builds derived values of feature vectors (e.g., representative off features in n packet samples) that are to be informative and non-redundant to facilitate the training phase of the training controller 304.

The example model trainer 406 (FIG. 4) trains a model to identify the workload type of the n packet samples based on the feature vector (block 608). For example, the model trainer 406 receives feature vectors corresponding to pre-processed and known packet samples and identifies a pattern in the features of the packet samples that maps the features of the packet samples to the workload category and outputs a model that captures these patterns. In examples, the output model is re-trained with different input samples until an acceptable amount of error is achieved.

The example model trainer 406 determines if another input of n packet samples is available (block 610). For example, the model trainer 406 determines whether data packets corresponding to different workloads are available. If the example model trainer 406 determines that another input of n packet samples is available (e.g., block 610 returns a value YES), control returns to block 602. If the example model trainer 406 determines that another input of n packet samples is not available (e.g., block 610 returns a value NO), then the example model trainer 406 generates a workload type prediction model (block 612). For example, the model trainer 406 outputs the trained model to the model publisher 410 (FIG. 4).

The example model publisher 410 publishes the workload type prediction model (block 614). For example, the model publisher 410 receives a model from the model trainer 406 and transforms it into a consumable format for publishing. The example model publisher 410 provides the published model to the example prediction controller 306 (FIG. 3) and the training operation 600 ends. In some examples, the training operation 600 is repeated when the feature extractor 404 obtains new packet samples from the pre-process controller 402.

Figure 7:
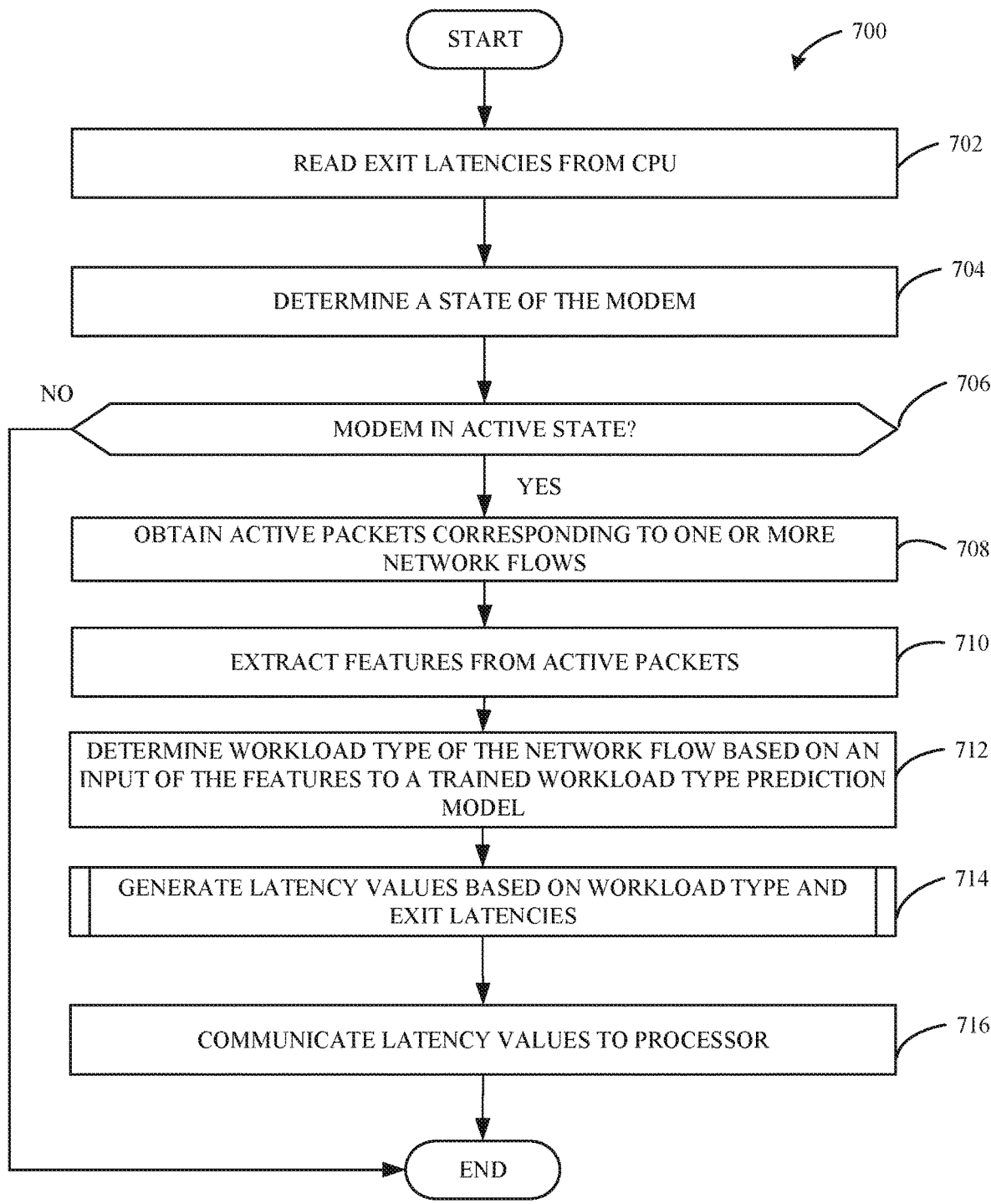
FIGS. 7-8 are flowcharts representative of machine readable instructions which may be executed to implement the example modem of FIGS. 2-3 to generate dynamic latency values in real time.

FIG. 7 illustrates an example inference operation 700 of the example modem 208 of FIG. 3 to classify data packets into a workload category and generate dynamic latency values based on the data packets. At block 702, the example latency value generator 310 (FIG. 3) reads the exit latencies from the example processor 206 (FIG. 2). For example, the latency value generator 310 queries the root complex device 212 to retrieve exit latency values for the different power saving states of the processor 206. In some examples, the root complex device 212 may query the memory controller 214 for exit latency values.

The example active status controller 308 (FIG. 3) determines a state of the example modem 208 (FIG. 2) (block 704). For example, the active status controller 308 determines whether the modem 208 is in a sleep state, an idle state, or an active state by querying the root complex device 212 (FIG. 2) for information regarding the state of the processor 206 (FIG. 2) (e.g., on or off), which corresponds to and/or is associated with the state of the modem 208. The example active status controller 308 determines whether the modem 208 is in an active state (block 706). For example, the active status controller 308 determines if the modem 208 is executing, processing, receiving, and/or sending data. If the example active status controller 308 determines the modem 208 is not in an active state (e.g., block 706 returns a value NO), the example inference operation 700 ends. For example, if the modem 208 is in a sleep state or an idle state, the latency value generator 310 generates maximum latency values to enable the processor 206 to go into a deep power saving state and does not require the information for generating dynamic latency values.

If the example active status controller 308 determines the modem 208 is in an active state (e.g., block 706 returns a value YES), the example prediction controller 306 obtains active packets corresponding to one or more network flows (block 708). For example, the network packet controller 302 provides network data packets, captured, to the prediction controller 306 for analysis and classification. In some examples, the active status controller 308 triggers the network packet controller 302 to send the active data packets to the prediction controller 306. In other examples, the active status controller 308 initiates the prediction controller 306 to query the network packet controller 302 for the active data packets.

The example prediction controller 306 extracts features from the active packets (block 710). For example, the prediction controller 306 identifies statistical information in the header(s) of the data packet(s) and extracts them out into a feature vector. The example prediction controller 306 determines a workload type of the network flow based on an input of the features to a trained workload type prediction model (block 712). For example, the prediction controller 306 implements the model, published by the training controller 304 (FIG. 3), to output a prediction about the classification of the active data packets. In some examples, the prediction indicates whether the active data packets are most likely to belong to a real-time workload, a non-real-time workload, a video call workload, a gaming workload, a file download workload, etc. In some examples, the prediction controller 306 outputs the prediction of the workload type to the latency value generator 310.

The example latency value generator 310 generates latency values based on the workload type and exit latencies (block 714). For example, the latency value generator 310 may determine, based on the performance and quality requirements of the workload type, as well as the exit latency of the processor 206, what an acceptable latency value would be. Further example instructions that may be used to implement block 714 are described below in connection with FIG. 8.

The example latency value generator 310 communicates latency values to the processor 206 (block 716). For example, the latency value generator 310 generates LTR messages, informing the memory controller 214 (FIG. 2) and/or the processor 206 to enter into a power saving state or a power execution state. In some examples, the latency value generator 310 reduces unnecessary consumption of power of the computing device platform 100 by sending such latency values to the processor 206.

Figure 8:
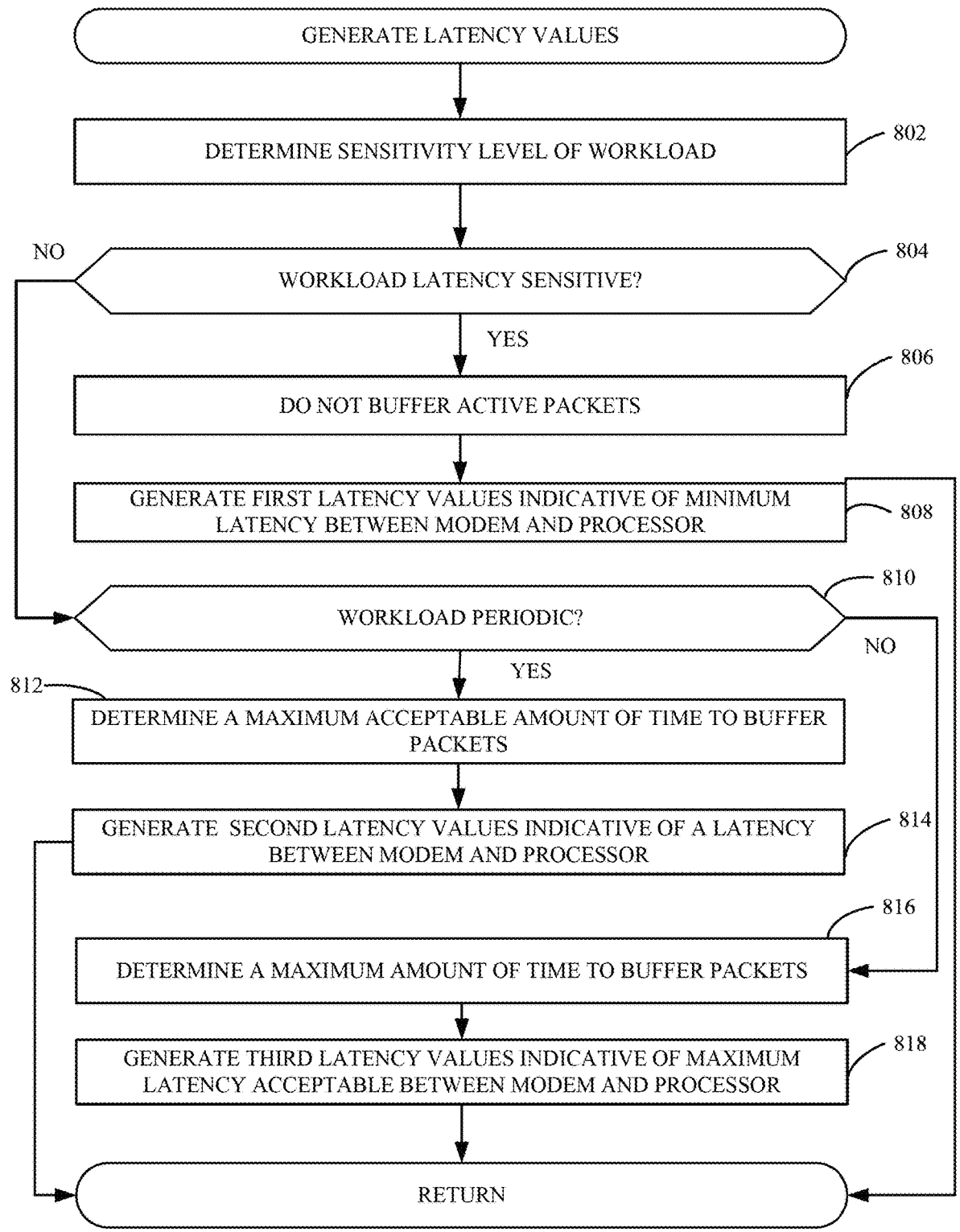

Turning to FIG. 8, the example latency generation program 714 begins when the example latency value generator 310 is triggered by the example prediction controller 306 to generate latency values. The example latency value generator 310 determines the sensitivity level of the workload (block 802). For example, the latency value generator 310 determines how latency sensitive the workload is. A latency sensitive workload corresponds to a workload that requires minimum latency during execution for purposes of performance. In some examples, the latency value generator 310 determines latency sensitive workloads based on the predicted classification (e.g., the assigned label) of the workload. For example, the workload classification may correspond to a particular priority level (e.g., QoS tag) which is related to the sensitivity of the workload.

The example latency value generator 310 determines if the workload is latency sensitive (block 804). For example, the latency value generator 310 determines if the workload requires high throughput, little to no latency, and/or high interaction. If the example latency value generator 310 determines the workload is latency sensitive (e.g., block 804 returns a value YES), the example latency value generator 310 determines that the example buffer 312 is to not buffer active packets (block 806). For example, the latency value generator 310 determines that buffering the active data packets, corresponding to a latency sensitive workload, causes performance issues. Therefore, active data packets of the latency sensitive workload are to be provided to the example memory 204 and/or the example processor 206 immediately for processing. Additionally and/or alternatively, the example latency value generator 310 determines that the example buffer 108 of the example wireless network device 104 is not to buffer active packets.

The example latency value generator 310 generates first latency values indicative of minimum latency between the example modem 208 and processor 206 (block 808). For example, the latency value generator 310 generates time values indicative of times for which the processor 206 is to receive and execute the active data packets. In some examples, the first latency values cause the processor 206 processing the packets to enter the power executing state. The example latency value generator 310 sends the first latency values to the example processor 206.

If the example latency value generator 310 determines that the workload is not latency sensitive (e.g., block 804 returns a value NO), the example latency value generator 310 determines whether the workload is periodic (block 810). For example, the latency value generator 310 determines whether data packets corresponding to the workload arrive and/or are retrieved by the network packet controller 302 periodically, frequently, etc. Such workloads that may be periodic are video calls (e.g., Skype meeting, WebEx meeting, etc.), audio calls, etc.

If the example latency value generator 310 determines that the workload is periodic (e.g., block 810 returns a value YES), the example latency value generator 310 determines a maximum acceptable amount of time to buffer packets (block 812). For example, the latency value generator 310 determines, based on the priority requirements of the workload, how long the active data packets can be buffered in the buffer 312 before performance is negatively affected.

The example latency value generator 310 generates second latency values indicative of a latency between the example modem 208 and the example processor 206 (block 814). For example, the latency determined by the latency value generator 310 corresponds to 1) the maximum amount of time acceptable to buffer the data packets of the periodic workload and 2) the exit latencies of the processor 206. In some examples, the second latency values are time values enabling the processor 206 to enter into a particular power saving state. The example latency value generator 310 sends the second latency values to the example processor 206.

If the example latency value generator 310 determines that the workload is not periodic (e.g., block 810 returns a value NO), the example latency value generator 310 determines a maximum amount of time to buffer packets (block 816). For example, if the workload is not latency sensitive nor periodic, the workload may correspond to a non-interactive workload. In such an example, the data packets are to be stored (e.g., buffered) in the buffer 312 for a maximum amount of time the buffer 312 can store the data, because performance will not be negatively affected. Additionally and/or alternatively, if the workload is not latency sensitive nor periodic, the example latency value generator 310 can make a request, via the example network traffic controller 314, to have the example buffer 108 of the example wireless network device 104 to buffer the data packets for the maximum amount of time.

The example latency value generator 310 generates third latency values indicative of the maximum latency acceptable between the example modem 208 and the example processor 206 (block 818). For example, the latency value generator 310 generates latency values corresponding to the maximum buffer time, which enables the processor 206 to enter into a power saving state. The example latency value generator 310 sends the latency values to the example processor 206.

Figure 9:
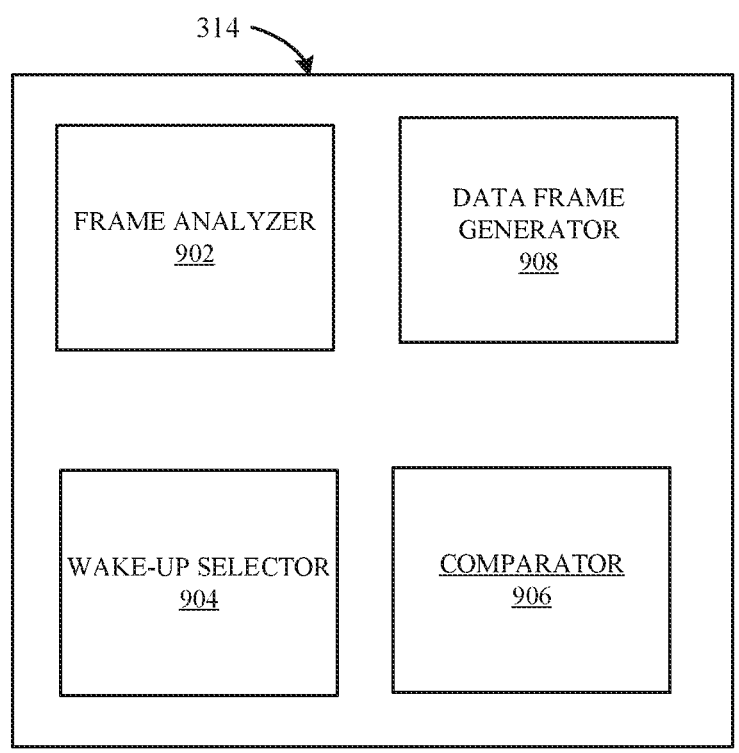
FIG. 9 is a block diagram of an example network traffic controller of FIG. 3 to generate time parameters based on network traffic and user requirements.

Turning to FIG. 9, a block diagram of the example network traffic controller 314 is illustrated. The example network traffic controller 314 is to generate target wait time parameters and/or skip period parameters based on workload types, user requirements, and beacons (e.g., AP data frames 110). The example network traffic controller 314 includes an example frame analyzer 902, an example wake-up selector 904, an example comparator 906, and an example data frame generator 908.

In FIG. 9, the example network traffic controller 314 includes the example frame analyzer 902 to analyze beacons (e.g., AP data frames 110) to determine the capability of the example wireless network device 104, the beacon interval set by the example wireless network device 104, and/or the traffic indication map element. Additionally and/or alternatively, the example frame analyzer 902 determines any other type of characteristic corresponding to the example wireless network device 104. The example frame analyzer 902 identifies information in the beacon and provides the information to the example wake-up selector 904. The example frame analyzer 902 receives the beacons from the example network packet controller 302 of FIG. 3.

In FIG. 9, the example network traffic controller 314 includes the example wake-up selector 904 to generate the target wait time parameters and/or skip time parameters based on information from the example frame analyzer 902, a prediction from the example prediction controller 306 of FIG. 3, and a user requirement status from the example user requirement selector 316 of FIG. 3. In some examples, the wake-up selector 904 is configured (e.g., by a developer, user, operator, etc.) to generate target wait time parameters or skip time parameters for the modem 208. In other examples, the wake-up selector 904 determines whether to generate a negotiable target wait time parameter or whether to generate a skip time parameter based on the information from the frame analyzer 902. For example, the wake-up selector 904 determines if the wireless network device 104 supports a power save mode defined in the 802.11 standard. The power save mode is a feature that enables the computing device platform 100 to save battery power via the target wait time parameters. The power save mode enables the computing device platform 100 to switch between active and sleep states to conserve energy based on the target wait time parameters. For example, the wireless network device 104 indicates in the TIM element of beacon (e.g., the TIM element 126 of the AP data frame 110) whether any unicast buffered packets are awaiting to be retrieved and whether any broadcast/multicast transmissions are awaiting to be retrieved (e.g., via a Delivery Traffic Indication Map (DTIM) indicator in the TIM element 126). The example modem 208 wakes up at every DTIM to receive multicast and/or broadcast data packets and wakes up to check the TIM element 126 of the beacon to determine if the wireless network device 104 is buffering any data packets. In some examples, if the modem 208 and/or more specifically the network packet controller 302 determines buffered data packets exist, the modem 208 follows a procedure defined in the 802.11 standard to retrieve corresponding packets. For example, the modem 208 transmits a power save (PS)-Poll to the wireless network device 104. The example wake-up selector 904 facilitates longer sleep cycles of the modem 208 and therefore less wake-up times (e.g., less than waking up every DTIM in some examples) of the modem 208 by generating efficient target wait time parameters and/or efficient skip time parameters. The efficiency of the parameters is related to the workload type and user preference, such that if the workload type does not require low latency (e.g., if the workload does not require the processor 206 to process data packets with minimal delay) and if the user preference status is indicative of power save optimization, then the parameter values are set to be long in duration relative to the transmit standard defined in the 802.11 specification (e.g., the beacon interval duration). Additionally, the efficiency of the parameters is related to the workload type and user preference such that if the workload type requires low latency from the computing device platform 100 and the user preference is indicative of power save optimization, then the parameter values are generated to strike a balance between the workload requirements and minimal power consumption.

In some examples, the wake-up selector 904 is in communication with the latency value generator 310 of FIG. 3. For example, the wake-up selector 904 may receive and/or retrieve information from the latency value generator 310 via a wire and/or wireless connection. In some examples, the wake-up selector 904 determines a target wait time and/or a target skip time based on the latency values generated by the latency value generator 310. For example, the latency values, indicative of a time to buffer network data packets and/or indicative of a power saving state, inform the wake-up selector 904 of an appropriate length of time for the wireless network device 104 of FIG. 1 to buffer the network data packets. In such an example, the wake-up selector 904 negotiates the latency value times with the wireless network device 104.

In FIG. 9, the example network traffic controller 314 includes the example comparator 906 to compare skip time parameters to a disassociation period of the wireless network device 104. As used herein, a disassociation period corresponds to an inactivity period between the wireless network device 104 and the computing device platform 100 that causes the wireless network device 104 to disassociate from the computing device platform 100, thereby disconnecting the computing device platform 100 from the network 102. The example comparator 906 compares a time value, generated by the wake-up selector 904, to a disassociation threshold (e.g., disassociation period) indicative of the time at which the wireless network device 104 disconnects the computing device platform 100 from the network 102. In some examples, if the time value meets and/or exceeds the disassociation threshold, the comparator 906 notifies the wake-up selector 904. In some examples, the wake-up selector 904 generates new skip time values that are less than the disassociation threshold.

In FIG. 9, the example network traffic controller 314 includes the example data frame generator 908 to generate a modem data frame. The example data frame generator 908 populates the data frame with information provided by the example wake-up selector 904. For example, the data frame generator 908 assigns a target wait time value to the listen interval field 136. In some examples, the data frame generator 908 provides the modem data frame to the network packet controller 302. The example network packet controller 302 transmits the data frame to the example wireless network device 104 to negotiate the value indicated in the listen interval field 136. In some examples, when the wireless network device 104 approves of the listen interval, the wireless network device 104 sends an acknowledgement back to the modem 208 and/or more specifically, the network packet controller 302. Such an acknowledgement indicates that the example wake-up controller 106 stores and/or buffers data packets for a duration of time corresponding to the value of the listen interval field 136.

In an example operation of the network traffic controller 314, the wake-up selector 904 configures and/or generates target wait time parameters when the frame analyzer 902 determines that the wireless network device 104 supports a power save mode. The example the wake-up selector 904 analyzes the workload type prediction from the prediction controller 306 and the user requirement status from the user requirement selector 316 in connection with each other to determine optimized target wait time values. For example, the wake-up selector 904 is conditioned and/or configured to analyze if power or performance is the goal and if the workload type includes high, medium, and/or low latency requirements. In some examples, if the user preference is indicative of power save and the workload type is indicative of a non-interactive workload (e.g., high latency), then the workload selector 904 generates a long duration target wait time value that informs and/or causes the wireless network device 104 to buffer data packets of the workload for a maximum period of time, wherein the maximum period of time is defined by the length of the buffer 108.

In some examples, if the user preference is indicative of performance and the workload type is indicative of non-interactive, then the workload selector 904 generates a target wait time value that causes the buffer 108 to buffer the data packets for a minimum required time, the minimum required time defined by the latency requirements of the workload type.

When the example wake-up selector 904 generates the target wait time parameter based on the user preference and workload requirements, the example data frame generator 908 generates a data frame that includes the target wait time. The example data frame generator 908 waits for an acknowledgement from the example wireless network device 104, indicative that the wireless network device 104 will buffer data packets for the target wait time. When the data frame generator 908 receives an acknowledgement, the example modem 208 enters a power saving state for the duration of the target wait time.

In an example second operation of the network traffic controller 314, the example wake-up selector 904 is configured to generate a skip time parameter when the frame analyzer 902 determines that the wireless network device 104 does not support a power save mode. The example the wake-up selector 904 analyzes the workload type prediction from the prediction controller 306 and the user requirement status from the user requirement selector 316 in connection with each other to determine optimized skip time values. For example, the wake-up selector 904 is conditioned and/or configured to analyze if power or performance is the goal and if the workload type includes high, medium, and/or low latency requirements. In some examples, if the user preference is indicative of power save and the workload type is indicative of a non-interactive workload, then the wake-up selector 904 generates skip time values that cause the network packet controller 302 to skip a maximum number of beacon intervals before retrieving data packets from the wireless network device 104, the maximum number of beacon intervals defined by the disassociation period of the wireless network device 104.

In some examples, if the user preference is indicative of performance and the workload type is indicative of a non-interactive workload, then the wake-up selector 904 generates a skip time value that causes the network packet controller 302 to retrieve data packets from the wireless network device 104 at every beacon interval (e.g., the skip time value may be zero in such an example).

In a third example, consider that the modem 208 obtains an AP data frame 110 that includes a DTIM bit in the TIM element 126 set to value 1. In such an example, the modem 208 is expected to receive beacons from the wireless network device 104 every beacon interval (e.g., approximately 102 ms). In addition, the computing device platform 100 and/or more specifically the example processor 106, is executing an email operation in the background without any foreground activity. The example modem 208 is expected to wake up to receive every beacon. However, the wake-up selector 904 identifies the class of traffic (e.g., the workload type) and the user preference and generates a skip time value equal to 500 ms to enable the modem 208 to remain in a sleep cycle for a longer duration of time. In such an example, the wake-up selector 904 has determined to skip four beacons. After the fifth beacon, modem 208 retrieves its buffered data by following one of the procedures defined in the 802.11 standard.

While an example manner of implementing the network traffic controller 314 of FIG. 3 is illustrated in FIG. 9, one or more of the elements, processes and/or devices illustrated in FIG. 9 may be combined, divided, re-arranged, omitted, eliminated and/or implemented in any other way. Further, the example frame analyzer 902, the example wake-up selector 904, the example comparator 906, the example data frame generator 908, and/or, more generally, the example network traffic controller 314 of FIG. 3 may be implemented by hardware, software, firmware and/or any combination of hardware, software and/or firmware. Thus, for example, any of the example frame analyzer 902, the example wake-up selector 904, the example comparator 906, the example data frame generator 908 and/or, more generally, the example network traffic controller 314 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example frame analyzer 902, the example wake-up selector 904, the example comparator 906, and/or the example data frame generator 908 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network traffic controller 314 of FIG. 3 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
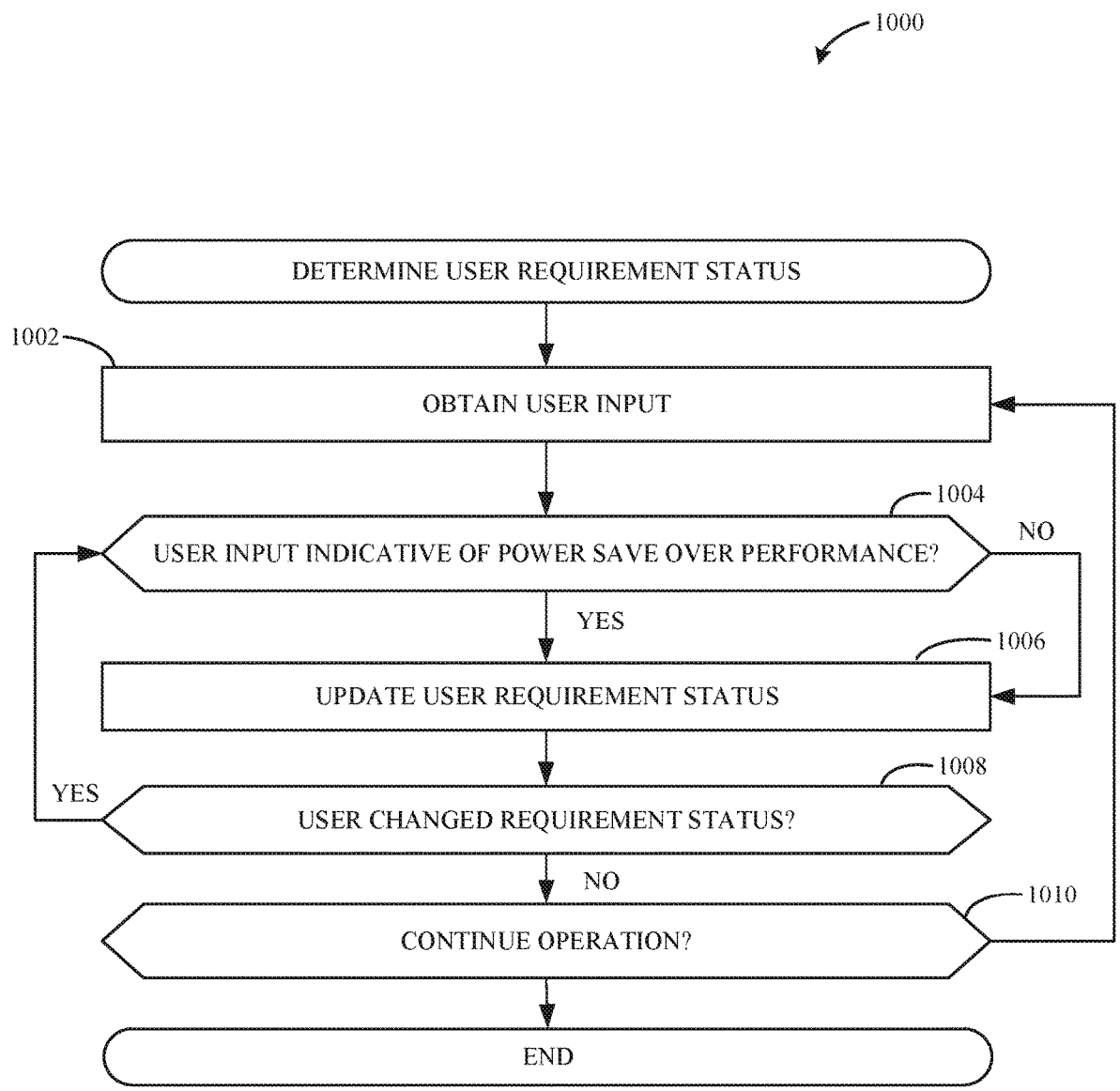
FIG. 10 is a flowchart representative of machine readable instructions which may be executed to implement an example user requirement selector of FIG. 3 to determine user preference statuses.
Figure 11:
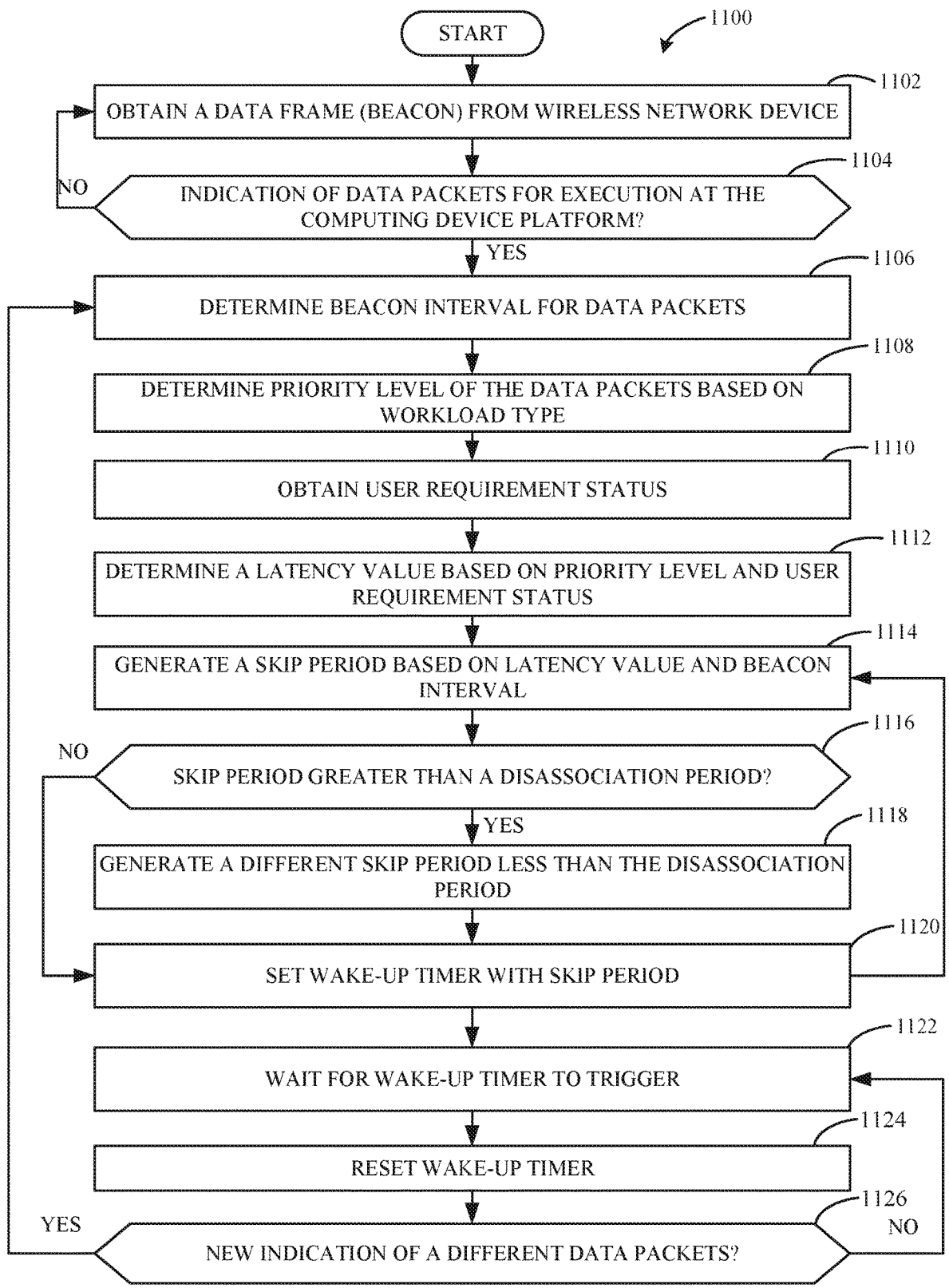
FIGS. 11-12 are flowcharts representative of machine readable instructions which may be executed to implement the example network traffic controller of FIGS. 3 and 9 to generate time parameters based on network traffic and user requirements.
Figure 12:
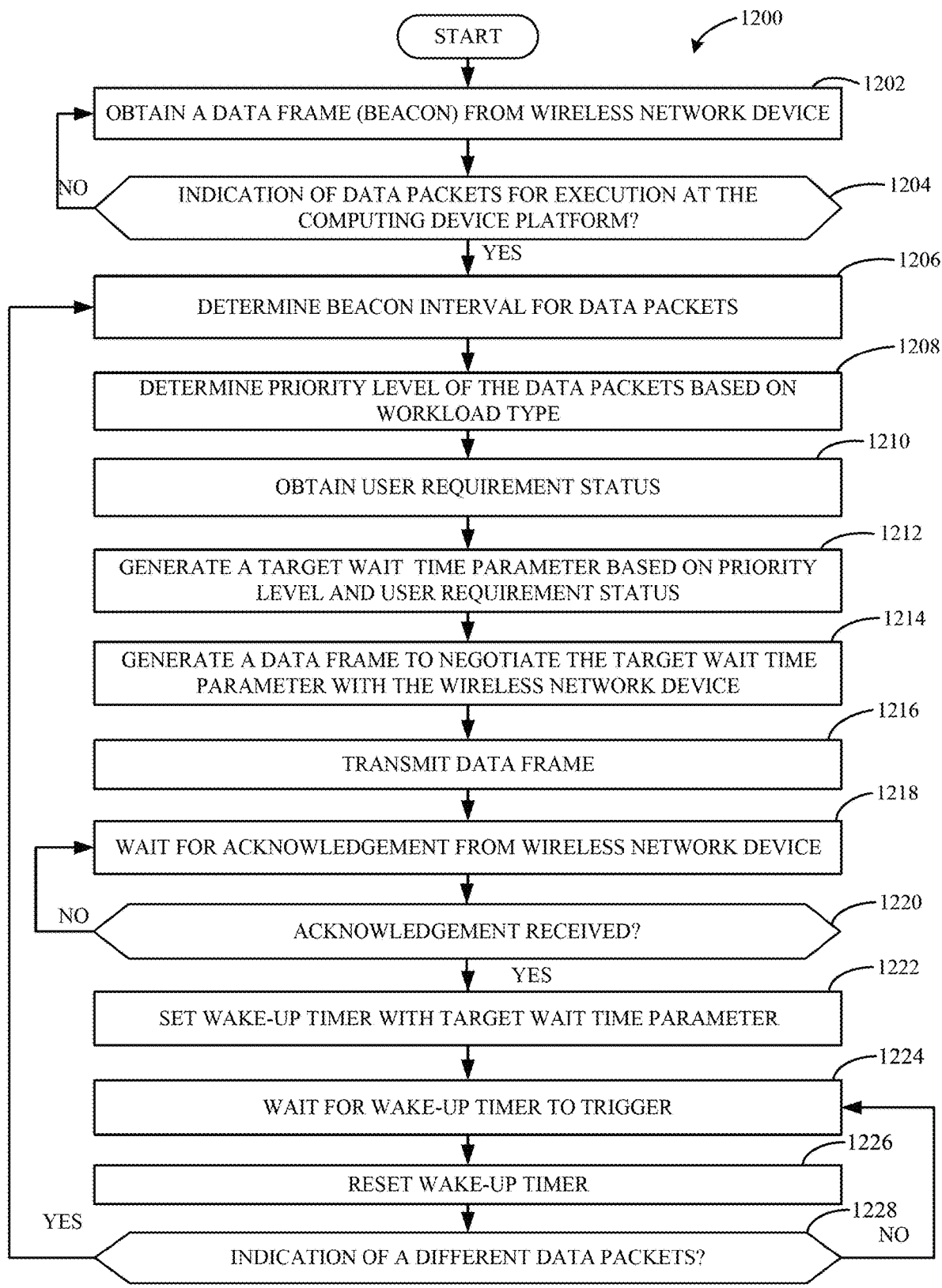

Flowcharts representative of example hardware logic, machine readable instructions, hardware implemented state machines, and/or any combination thereof for implementing the network traffic controller 314 of FIGS. 3 and 9 are shown in FIGS. 11-12. Additionally, a flowchart representative of example hardware logic, machine readable instructions, hardware implemented state machines, and/or any combination thereof for implementing the user requirement selector 316 of FIG. 3 is shown in FIG. 10. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 10-12, many other methods of implementing the example network traffic controller 314 and user requirement selector 316 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 illustrates an example user preference operation 1000 of the example user requirement selector 316 of FIG. 3 to determine a user requirement status of the example computing device platform 100. At block 1002, the example user requirement selector 316 obtains user input. For example, the user requirement selector 316 obtains information from the processor 206 (FIG. 2) and/or memory 204 (FIG. 2) corresponding to input data from a user.

The example user requirement selector 316 determines if the user input is indicative of power save over performance (block 1004). For example, the user requirement selector 316 determines if the ratio between power save and performance favors a power save option over a performance option. In some examples, such a ratio indicates that the user desires optimal battery life over optimal performance.

If the example user requirement selector 316 determines that the input is indicative of power save over performance (e.g., block 1004 returns a value YES), the example user requirement selector 316 updates a user requirement status (block 1006). For example, the user requirement selector 316 may store and provide a status value that informs the network traffic controller 314 of a user preference. In some examples, the user requirement status may be a ratio value, a bit value, and/or any type of numerical value.

If the example user requirement selector 316 determines that the input is not indicative of power save over performance (e.g., block 1004 returns a value NO), the example user requirement selector 316 updates the user requirement status (block 1006). For example, the user requirement selector 316 updates the user requirement status to indicate that performance optimization has been selected by the user. Performance optimization is determined because the ratio did not favor power saving and, thus, most likely favors performance optimization.

The example user requirement selector 316 determines if the user has changed the requirement status (block 1008). For example, the user requirement selector 316 may receive the user input data from the processor 206 periodically and determine whether the user input has changed. Additionally and/or alternatively, the user requirement selector 316 obtains user input each time the user updates the preferences.

If the example user requirement selector 316 determines that the user has changed the requirement status (e.g., block 1008 returns a value YES), control returns to block 1004. If the example user requirement selector 316 determines that the user has not changed the requirement status (e.g., block 1008 returns a value NO), the example user requirement selector 316 determines if the operation is to continue (block 1010). In some examples, the user requirement selector 316 continues operation until power is removed from the computing device platform 100, if the user preference setting is turned off, etc. If the example user requirement selector 316 determines that the user preference operation 1000 is to continue (e.g., block 1010 returns a value YES), control returns to block 1002. If the example user requirement selector 316 determines the user preference operation 1000 is not to continue (e.g. block 1010 returns a value NO), the example user preference operation 1000 ends.

Turning to FIG. 11, an example skip frame operation 1100 of the example network traffic controller 314 of FIGS. 3 and 9 is illustrated to generate a skip period. At block 1102, the example frame analyzer 902 (FIG. 9) obtains a data frame (beacon) from the example wireless network device 104. For example, the network packet controller 302 (FIG. 3) provides an example AP data frame 110 to the example network traffic controller 314.

The example frame analyzer 902 determines if there is an indication of data packets for execution at the computing device platform 100 (block 1104). For example, the frame analyzer 902 analyzes the TIM element 126 of the AP data frame 110 to determine if data packets, intended for the computing device platform 100, are buffered at the wireless network device 104. If the example frame analyzer 902 determines data packets are not indicated at the example wireless network device 104 (e.g., block 1104 returns a value NO), the example frame analyzer 902 waits for another data frame.

If the example frame analyzer 902 determines data packets are indicated at the example wireless network device 104 (e.g., block 1104 returns a value YES), the example frame analyzer 902 determines a beacon interval for the data packets (block 1106). For example, the frame analyzer 902 identifies the beacon interval time in the beacon interval field 118 of the AP data frame 110. In some examples, the frame analyzer 902 provides the beacon interval to the wake-up selector 904 (FIG. 9).

The example wake-up selector 904 determines a priority level of the data packets based on the workload type (block 1108). For example, the wake-up selector 904 determines the QoS requirements of the workload type, the workload type determined by the example prediction controller 306 (FIG. 3) and provided to the wake-up selector 904.

The example wake-up selector 904 obtains the user requirement status (block 1110). For example, the wake-up selector 904 queries the user requirement selector 316 (FIG. 3) for the requirement status.

The example wake-up selector 904 determines a latency value based on the priority level and the user requirement status (block 1112). For example, the wake-up selector 904 determines a latency value that strikes a balance between the QoS requirements (e.g., maximum acceptable latency for the workload type) and the user requirement status (e.g., optimize for performance or power). In some examples, the latency value is a value of time indicative of a desired time for the modem 208 to remain in a power saving state.

The example wake-up selector 904 generates a skip period based on the latency value and the beacon interval (block 1114). For example, the wake-up selector 904 determines how many times the modem 208 is to skip the retrieval of data frames and/or data packets from the wireless network device 104. In some examples, the skip period is generated in terms of beacon intervals.

The example comparator 906 (FIG. 9) determines if the skip period is greater than a disassociation period (block 1116). For example, the comparator 906 obtains the skip period from the wake-up selector 904 and compares the period of time to a time that the wireless network device 104 disassociates itself from the computing device platform 100. If the example comparator 906 determines that the skip period is greater than disassociation period (e.g., block 1116 returns a value YES), the example wake-up selector 904 generates a different skip period less than the disassociation period (block 1118). For example, if the skip period exceeds and/or meets the dissociation period, the wake-up selector 904 generates a new skip period that equals a time value less than the disassociation period.

The example wake-up selector 904 sets a wake-up timer with the skip period (block 1120). For example, the wake-up timer may be a timer of the modem 208 that informs the modem 208 when to request power to retrieve network data. In some examples, if the example comparator 906 determines that the skip period is not greater than disassociation period (e.g., block 1116 returns a value NO), the example wake-up selector 904 sets the wake-up timer with the skip period (block 1120).

The example modem 208 and/or more specifically the example wake-up selector 904 waits for the wake-up timer to trigger (block 1122). For example, the modem 208 waits for the clock to run down from the skip period.

The example wake-up selector 904 resets the wake-up timer (block 1124). For example, the wake-up selector 904 resets the wake-up timer with the skip period.

The example wake-up selector 904 determines if there is an indication of different data packets (block 1126). For example, the wake-up selector 904 determines if a new workload is running at the computing device platform 100. If the example wake-up selector 904 determines different data packets are at the example wireless network device 104 (e.g., block 1126 returns a value YES), control returns to block 1106. For example, when the wake-up selector 904 receives a new and/or different prediction from the prediction controller 306, the wake-up selector 904 determines a new workload is executing. If the example wake-up selector 904 determines different data packets are not at the example wireless network device 104 (e.g., block 1126 returns a value NO), control returns to block 1122.

In some examples, the skip frame operation 1100 ends when the example network traffic controller 314 determines that the wireless network device 104 supports target wait time negotiations.

Turning to FIG. 12, an example target wait time operation 1200 of the example network traffic controller 314 of FIGS. 3 and 9 is illustrated to generate a target wait time. At block 1202, the example frame analyzer 902 (FIG. 9) obtains a data frame (beacon) from the example wireless network device 104. For example, the network packet controller 302 (FIG. 3) provides an example AP data frame 110 to the example network traffic controller 314.

The example frame analyzer 902 determines if there is an indication of data packets for execution at the computing device platform 100 (block 1204). For example, the frame analyzer 902 analyzes the TIM element 126 of the AP data frame 110 to determine if data packets, intended for the computing device platform 100, are buffered at the wireless network device 104. If the example frame analyzer 902 determines data packets are not indicated at the example wireless network device 104 (e.g., block 1204 returns a value NO), the example frame analyzer 902 waits for another data frame.

If the example frame analyzer 902 determines data packets are indicated at the example wireless network device 104 (e.g., block 1204 returns a value YES), the example frame analyzer 902 determines a beacon interval for the data packets (block 1206). For example, the frame analyzer 902 identifies the beacon interval time in the beacon interval field 118 of the AP data frame 110. In some examples, the frame analyzer 902 provides the beacon interval to the wake-up selector 904 (FIG. 9).

The example wake-up selector 904 determines a priority level of the data packets based on the workload type (block 1208). For example, the wake-up selector 904 determines the QoS requirements of the workload type, the workload type determined by the example prediction controller 306 (FIG. 3) and provided to the wake-up selector 904.

The example wake-up selector 904 obtains the user requirement status (block 1210). For example, the wake-up selector 904 queries the user requirement selector 316 (FIG. 3) for the user requirement status, indicative of a user preference.

The example wake-up selector 904 generates a target wait time parameter based on the priority level and the user requirement status (block 1212). For example, the wake-up selector 904 determines a time value indicative of a desired time for the modem 208 to remain in a power saving state, and thus, a desired time for the buffer 108 (FIG. 1) to buffer the data packets for the computing device platform 100. In some examples, the target wait time is long when the user requirement status is indicative to save battery power over performance and/or when the workload type includes relatively high latency requirements. In other examples, the target wait time is short when the user requirement status is indicative to enhance performance and/or when the workload type is very latency sensitive.

The example data frame generator 908 generates a data frame to negotiate the target wait time parameter with the example wireless network device 104 (block 1214). For example, the data frame generator 908 populates a modem data frame 112 with a listen interval field 136 that equals the target wait time.

The example data frame generator 908 transmits the data frame (block 1216). For example, the data frame generator 908 sends the data frame to the wireless network device 104 via the network packet controller 302.

The example frame analyzer 902 waits for an acknowledgement from the example wireless network device 104 (block 1218). For example, the frame analyzer 902 may be provided a beacon including an acknowledgement of acceptance of the target wait time. At block 1220, the frame analyzer 902 determines if the acknowledgement has been received. In some examples, the acknowledgement is not received (e.g., block 1220 returns a value NO) and the frame analyzer 902 continues to wait (block 1218).

In other examples, the frame analyzer 902 determines that the acknowledgement has been received (e.g., block 1220 returns a value YES) and the example wake-up selector 904 sets the wake-up timer with the target wait time parameter (block 1222). For example, the wake-up timer may be a timer of the modem 208 that informs the modem 208 when to request power to retrieve network data.

The example modem 208 and/or more specifically the example wake-up selector 904 waits for the wake-up timer to trigger (block 1224). For example, the modem 208 waits for the clock to run down from the target wait time.

The example wake-up selector 904 resets the wake-up timer (block 1226). For example, the wake-up selector 904 resets the wake-up timer with the target wait time.

The example wake-up selector 904 determines if there is an indication of different data packets (block 1228). For example, the wake-up selector 904 determines if a new workload is running at the computing device platform 100. If the example wake-up selector 904 determines different data packets are at the example wireless network device 104 (e.g., block 1228 returns a value YES), control returns to block 1206. For example, when the wake-up selector 904 receives a new and/or different prediction from the prediction controller 306, the wake-up selector 904 determines a new workload is executing. If the example wake-up selector 904 determines different data packets are not at the example wireless network device 104 (e.g., block 1228 returns a value NO), control returns to block 1224.

In some examples, the target wait time operation 1200 ends when the example network traffic controller 314 determines that the wireless network device 104 no longer supports target wait time negotiations.

Figure 13:
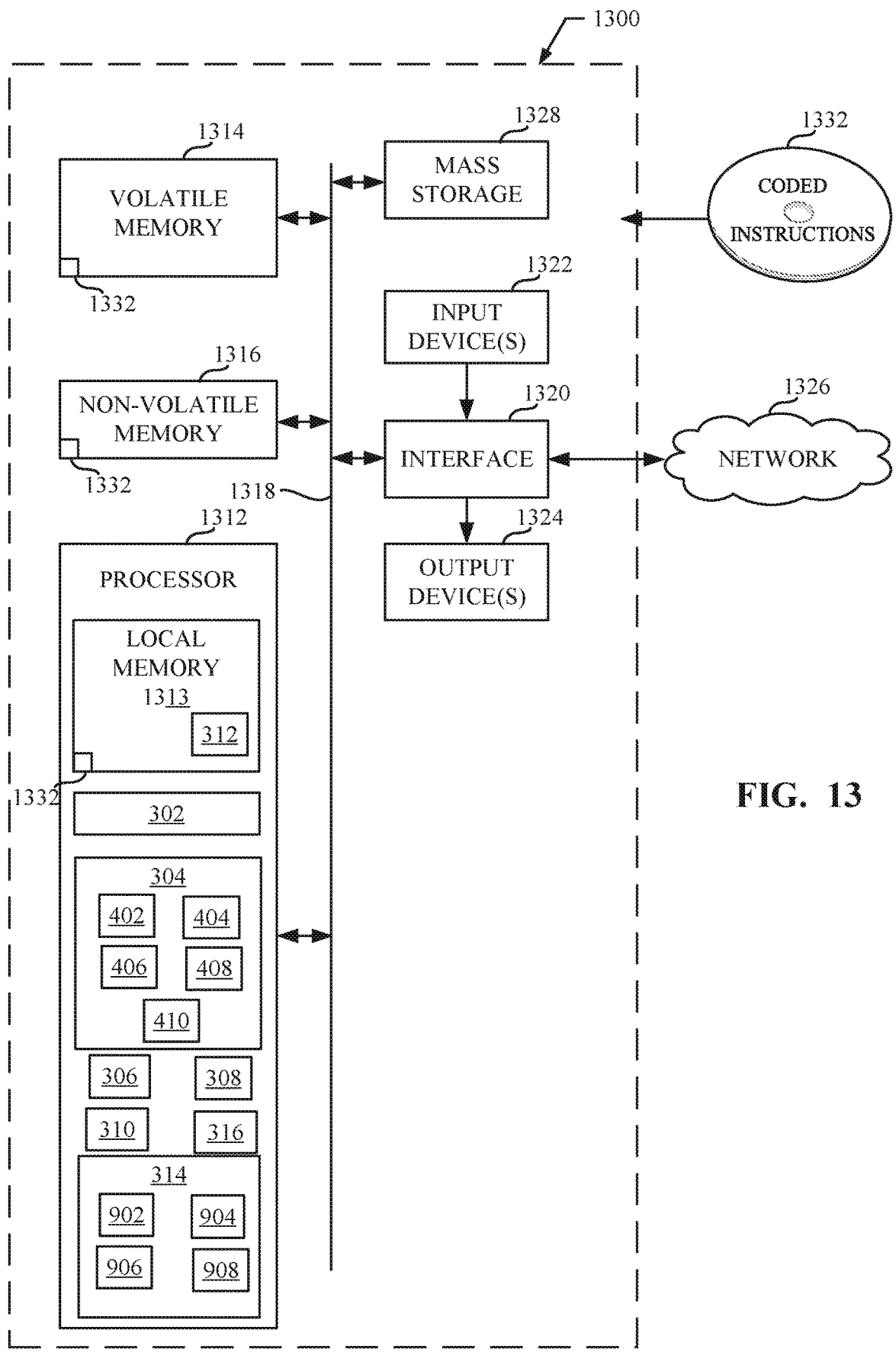
FIG. 13 is a block diagram of an example processing platform structured to execute the instructions of FIGS. 5-8 and FIGS. 10-12 to implement the example modem of FIGS. 2, 3, 4, and 9.

FIG. 13 is a block diagram of an example processor platform 1300 structured to execute the instructions of FIGS. 5, 6, 7, 8, 10, 11, and 12 to implement the modem 208 of FIGS. 2, 3, 4, and 9. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example modem 208, the example network packet controller 302, the example training controller 304, the example prediction controller 306, the example active status controller 308, the example latency value generator 310, the example network traffic controller 314, the example user requirement selector 316, the example pre-processor 402, the example feature extractor 404, the example model trainer 406, the example error loss controller 408, the example model publisher 410, the example frame analyzer 902, the example wake-up selector 904, the example comparator 906, and the example data frame generator 908.

The processor 1312 of the illustrated example includes a local memory 1313 (e.g., a cache). In some examples, the local memory 1313 implements the example buffer 312. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip, and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 5-8 and 10-12 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that infer workload types of network traffic and user preferences of a computing device to enable a wake-up selector to generate wait times that facilitate maximum power saving and/or maximum performance of a computing device platform connected to Wi-Fi. The examples disclosed herein negotiate the number of beacon intervals with a wireless network device to reduce the number of times the modem wakes for network traffic retrieval in medium to high latency scenarios (e.g., when the workload type does not require low latency) and/or power optimization preference scenarios, thus facilitating deep power saving states of a processor and the modem for longer durations of time and hence longer battery life. The disclosed methods, apparatus and articles of manufacture improve the efficiency of using a computing device by facilitating power saving and performance of the computing device when wait times are generated. The disclosed methods, apparatus and articles of manufacture are accordingly directed to one or more improvement(s) in the functioning of a computer.

Example methods, apparatus, systems, and articles of manufacture to coordinate network traffic between wireless network devices and computing are disclosed herein. Further examples and combinations thereof include the following:

Example 1 includes an apparatus comprising a wake-up selector to generate a target wait time parameter based on a workload type of a number of packets obtained from a network device and a user preference, the target wait time parameter indicative of a time interval that, when met, causes a modem to retrieve the number of packets, a data frame generator to generate a data frame that causes the network device to buffer the number of packets for the time interval, and a network packet controller to negotiate, using the data frame, the target wait time parameter with a network device.

Example 2 includes the apparatus of example 1, further including a prediction controller to generate a prediction indicative of a likelihood that the number of packets correspond to the workload type based on a trained model.

Example 3 includes the apparatus of example 2, wherein the prediction controller is to extract a number of features from the number of packets corresponding to statistical characteristics of packets to generate a feature vector, wherein the prediction is based on the feature vector.

Example 4 includes the apparatus of example 1, further including a user requirement selector to determine that the user preference is indicative of optimizing power savings over performance.

Example 5 includes the apparatus of example 4, wherein the wake-up selector is to generate the target wait time parameter indicative of a maximum acceptable amount of time to enter a power save state before retrieving the number of packets based on the user preference of optimizing power savings and the workload type.

Example 6 includes the apparatus of example 1, further including a user requirement selector to determine that the user preference is indicative of optimizing performance over power savings.

Example 7 includes the apparatus of example 6, wherein the wake-up selector is to generate the target wait parameter to be indicative of a minimum acceptable amount of time to enter a power save state before retrieving the number of packets based on the user preference of optimizing performance and the workload type.

Example 8 includes a non-transitory computer readable storage medium comprising instructions that, when executed, cause one or more processors to at least generate a target wait time parameter based on a workload type of a number of packets obtained from a network device and a user preference, the target wait time parameter indicative of a time interval that, when met, causes a modem to retrieve the number of packets, generate a data frame that causes the network device to buffer the number of packets for the time interval, and negotiate, using the data frame, the target wait time parameter with a network device.

Example 9 includes the non-transitory computer readable storage medium of example 8, wherein the instructions, when executed, cause the one or more processors to generate a prediction indicative of a likelihood that the number of packets correspond to the workload type based on a trained model.

Example 10 includes the non-transitory computer readable storage medium of example 9, wherein the instructions, when executed, cause the one or more processors to extract a number of features from the number of packets corresponding to statistical characteristics of packets to generate a feature vector, wherein the prediction is based on the feature vector.

Example 11 includes the non-transitory computer readable storage medium of example 8, wherein the instructions, when executed, cause the one or more processors to determine that the user preference is indicative of optimizing power savings over performance.

Example 12 includes the non-transitory computer readable storage medium of example 11, wherein the instructions, when executed, cause the one or more processors to generate the target wait time parameter indicative of a maximum acceptable amount of time to enter a power save state before retrieving the number of packets based on the user preference of optimizing power savings and the workload type.

Example 13 includes the non-transitory computer readable storage medium of example 8, wherein the instructions, when executed, cause the one or more processors to determine that the user preference is indicative of optimizing performance over power savings.

Example 14 includes the non-transitory computer readable storage medium of example 13, wherein the instructions, when executed, cause the one or more processors to generate the target wait parameter to be indicative of a minimum acceptable amount of time to enter a power save state before retrieving the number of packets based on the user preference of optimizing performance and the workload type.

Example 15 includes a method comprising generating a target wait time parameter based on a workload type of a number of packets obtained from a network device and a user preference, the target wait time parameter indicative of a time interval that, when met, causes a modem to retrieve the number of packets, generating a data frame that causes the network device to buffer the number of packets for the time interval, and negotiating, using the data frame, the target wait time parameter with a network device.

Example 16 includes the method of example 15, further including generating a prediction indicative of a likelihood that the number of packets correspond to the workload type based on a trained model.

Example 17 includes the method of example 15, further including determining that the user preference is indicative of optimizing power saving over performance.

Example 18 includes the method of example 17, further including generating the target wait time parameter indicative of a maximum acceptable amount of time to enter a power save state before retrieving the number of packets based on the user preference of optimizing power savings and the workload type.

Example 19 includes the method of example 15, further including determining that the user preference is indicative of optimizing performance over power savings.

Example 20 includes the method of example 19, further including generating the target wait parameter to be indicative of a minimum acceptable amount of time to enter a power save state before retrieving the number of packets based on the user preference of optimizing performance and the workload type.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing device platform to communicate with a network device, the computing device platform comprising:
    network interface circuitry to communicate a data frame including a target wait time parameter to the network device;
    computer readable instructions; and
    processor circuitry to be programmed by the computer readable instructions to:
        generate the target wait time parameter based on a workload type of packets obtained from the network device and based on a user preference to prioritize power savings or performance when obtaining packets, wherein the target wait time parameter is indicative of a time interval at which the network interface circuitry is to obtain the packets from the network device; and
        generate the data frame including the target wait time parameter to cause the network device to buffer packets for the time interval.

2. The computing device platform of claim 1, wherein the processor circuitry is to generate a prediction indicative of a likelihood that the packets correspond to the workload type based on a trained model.

3. The computing device platform of claim 2, wherein the processor circuitry is to extract features from the packets corresponding to statistical characteristics of packets to generate a feature vector, wherein the prediction is based on the feature vector.

4. The computing device platform of claim 1, wherein the processor circuitry is to determine that the user preference is indicative of optimizing power savings over performance.

5. The computing device platform of claim 4, wherein the target wait time parameter is indicative of a maximum acceptable amount of time to enter a power save state before obtaining packets based on the user preference of optimizing power savings and the workload type.

6. The computing device platform of claim 1, wherein the processor circuitry is to determine that the user preference is indicative of optimizing performance over power savings.

7. The computing device platform of claim 6, wherein the target wait time parameter is indicative of a minimum acceptable amount of time to enter a power save state before obtaining packets based on the user preference of optimizing performance and the workload type.

8. At least one non-transitory machine readable storage medium comprising machine readable instructions to cause at least one processor circuit to at least:
    generate a target wait time parameter based on a workload type of first packets obtained from a network device and based on a user preference to prioritize power savings or performance when obtaining additional packets, wherein the target wait time parameter is indicative of a time interval at which a modem is to obtain the additional packets;
    generate a data frame including the target wait time parameter; and
    cause the modem to communicate the data frame including the target wait time parameter to the network device to cause the network device to buffer packets based on the time interval.

9. The at least one non-transitory machine readable storage medium of claim 8, wherein the machine readable instructions cause one or more of the at least one processor circuit to generate a prediction indicative of a likelihood that the first packets correspond to the workload type based on a trained model.

10. The at least one non-transitory machine readable storage medium of claim 9, wherein the machine readable instructions cause one or more of the at least one processor circuit to extract a number of features from the first packets corresponding to statistical characteristics of the first packets to generate a feature vector, wherein the prediction is based on the feature vector.

11. The at least one non-transitory machine readable storage medium of claim 8, wherein the machine readable instructions cause one or more of the at least one processor circuit to determine that the user preference is indicative of optimizing power savings over performance.

12. The at least one non-transitory machine readable storage medium of claim 11, wherein the target wait time parameter is indicative of a maximum acceptable amount of time to enter a power save state before obtaining additional packets based on the user preference of optimizing power savings and the workload type.

13. The at least one non-transitory machine readable storage medium of claim 8, wherein the machine readable instructions cause one or more of the at least one processor circuit to determine that the user preference is indicative of optimizing performance over power savings.

14. The at least one non-transitory machine readable storage medium of claim 13, wherein the target wait time parameter is indicative of a minimum acceptable amount of time to enter a power save state before obtaining additional packets based on the user preference of optimizing performance and the workload type.

15. A method comprising:
generating a target wait time parameter based on a workload type of packets obtained from a network device and based on a user preference to prioritize power savings or performance when obtaining packets, wherein the target wait time parameter is indicative of a time interval at which a modem is to receive the packets;
generating a data frame including the target wait time parameter; and
transmitting the data frame to the network device to cause the network device to transmit packets in accordance with the time interval of the target wait time parameter.

16. The method of claim 15, further including generating a prediction indicative of a likelihood that the packets correspond to the workload type based on a trained model.

17. The method of claim 15, wherein the user preference is indicative of optimizing power saving over performance.

18. The method of claim 17, wherein the target wait time parameter is indicative of a maximum acceptable amount of time to enter a power save state based on the user preference of optimizing power savings and the workload type.

19. The method of claim 15, wherein the user preference is indicative of optimizing performance over power savings.

20. The method of claim 19, wherein the target wait time parameter is indicative of a minimum acceptable amount of time to enter a power save state based on the user preference of optimizing performance and the workload type.

\* \* \* \* \*